United States Patent
Kataoka et al.

(10) Patent No.: US 11,461,909 B2
(45) Date of Patent: Oct. 4, 2022

(54) METHOD, MEDIUM, AND APPARATUS FOR SPECIFYING OBJECT INCLUDED IN IMAGE UTILIZING INVERTED INDEX

(71) Applicant: FUJITSU LIMITED, Kawasaki (JP)

(72) Inventors: Masahiro Kataoka, Kamakura (JP); Ryo Matsumura, Numazu (JP); Yasuhiro Suzuki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 15 days.

(21) Appl. No.: 17/117,345

(22) Filed: Dec. 10, 2020

(65) Prior Publication Data
US 2021/0090276 A1    Mar. 25, 2021

Related U.S. Application Data

(63) Continuation of application No. PCT/JP2018/022645, filed on Jun. 13, 2018.

(51) Int. Cl.
*G06T 7/543* (2017.01)
*G06F 16/583* (2019.01)
*G06F 16/51* (2019.01)

(52) U.S. Cl.
CPC .............. *G06T 7/543* (2017.01); *G06F 16/51* (2019.01); *G06F 16/5846* (2019.01); *G06F 16/5854* (2019.01)

(58) Field of Classification Search
None
See application file for complete search history.

(56) References Cited

U.S. PATENT DOCUMENTS

| 6,320,595 B1 | 11/2001 | Simons et al. |
| 2007/0130112 A1* | 6/2007 | Lin .................. G06F 16/41 |
| 2008/0079728 A1 | 4/2008 | Sugita |

(Continued)

FOREIGN PATENT DOCUMENTS

| EP | 2557540 A1 | 2/2013 |
| JP | 7-320056 A | 12/1995 |

(Continued)

OTHER PUBLICATIONS

International Search Report dated Sep. 11, 2018, issued in counterpart International Application No. PCT/JP2018/022645 (5 pages, including Japanese original and English translation).

(Continued)

*Primary Examiner* — Jeffrey J Chow
(74) *Attorney, Agent, or Firm* — WHDA, LLP

(57) ABSTRACT

A file generating device (100) extracts, when a captured image captured by an image capturing device is acquired, based on the acquired captured image, a shape of an object included in the captured image and generates, based on the extracted shape, text information that includes a drawing indication of the shape. The information processing apparatus (200) refers to a storage unit that stores therein, regarding each of a plurality of objects, identification information on the objects in association with the text information that includes a drawing indication of the objects and acquires identification information on an object, from among the plurality of objects, that is associated with the text information in which similarity to the generated text information satisfies a criterion.

6 Claims, 22 Drawing Sheets

(56) References Cited

U.S. PATENT DOCUMENTS

| | | | | |
|---|---|---|---|---|
| 2009/0119257 | A1* | 5/2009 | Waters | G06F 16/951 |
| 2012/0054177 | A1* | 3/2012 | Wang | G06V 30/32 |
| | | | | 707/723 |
| 2015/0199402 | A1* | 7/2015 | Agrawal | G06F 16/24578 |
| | | | | 707/723 |
| 2016/0132498 | A1* | 5/2016 | Wang | G06T 7/50 |
| | | | | 382/165 |
| 2017/0024384 | A1* | 1/2017 | Kant | G06F 16/2246 |

FOREIGN PATENT DOCUMENTS

| | | |
|---|---|---|
| JP | 2001-519986 A | 10/2001 |
| JP | 2002-15329 A | 1/2002 |
| JP | 2006-209353 A | 8/2006 |
| JP | 2010-224981 A | 10/2010 |
| JP | 2013-80524 A | 5/2013 |
| JP | 2017-10468 A | 1/2017 |
| JP | 2017-215784 A | 12/2017 |
| WO | 99/37095 A2 | 7/1999 |

OTHER PUBLICATIONS

Written Opinion of the International Searching Authority dated Sep. 11, 2018, issued in counterpart International Application No. PCT/JP2018/022645 (6 pages, including Japanese original and English translation).

Extended (Supplementary) European Search Report dated May 25, 2021, issued in counterpart EP Application No. 18922595.6. (7 pages).

Office Action dated Jul. 14, 2021, issued in counterpart AU Application No. 2018427622. (3 pages).

* cited by examiner

| | 141a | | | 141b |
|---|---|---|---|---|
| TIME | FIRST CAPTURED IMAGE DATA | | TIME | SECOND CAPTURED IMAGE DATA |
| TIME t1 | FIRST CAPTURED IMAGE DATA AT TIME t1 | | TIME t1 | SECOND CAPTURED IMAGE DATA AT TIME t1 |
| TIME t2 | FIRST CAPTURED IMAGE DATA AT TIME t2 | | TIME t2 | SECOND CAPTURED IMAGE DATA AT TIME t2 |
| TIME t3 | FIRST CAPTURED IMAGE DATA AT TIME t3 | | TIME t3 | SECOND CAPTURED IMAGE DATA AT TIME t3 |
| ... | ... | | ... | ... |

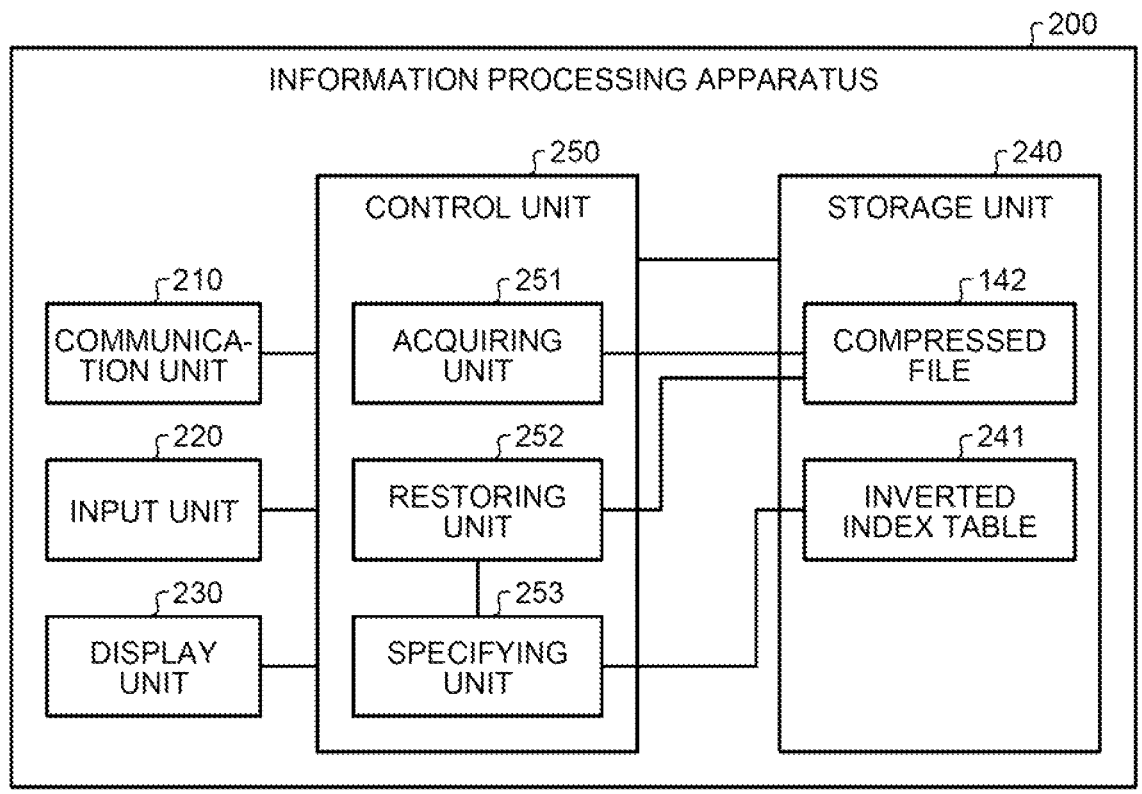

FIG.13

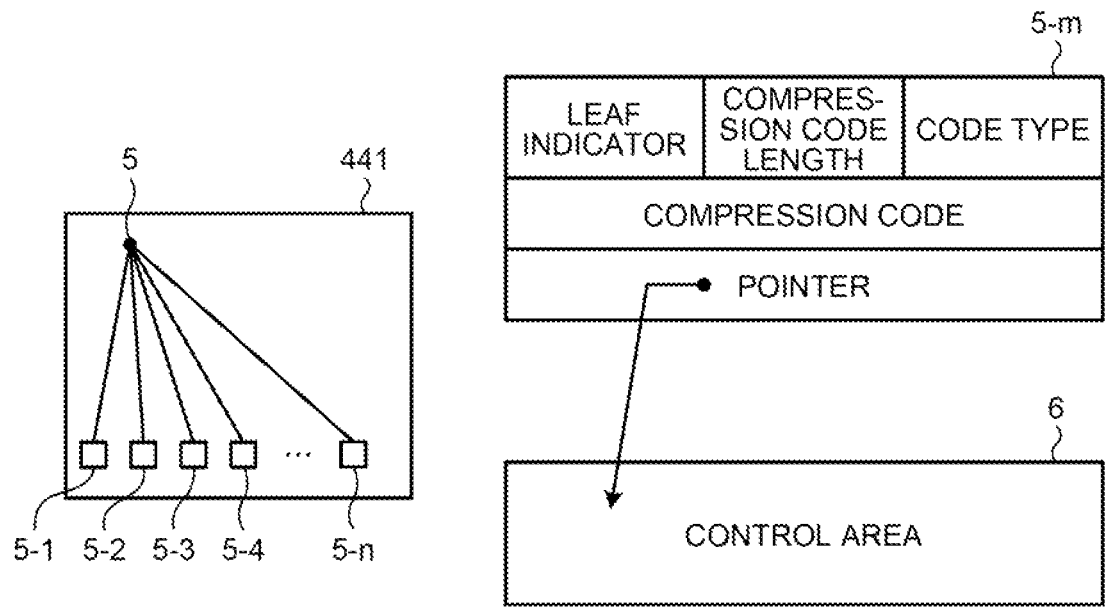

FIG.21

| GROUP IDENTIFICA-TION INFORMATION | IDENTIFICATION INFORMATION | PostScript COMPRESSED DATA |
|---|---|---|
| G001 | C001 | PostScript COMPRESSION DATA ASSOCIATED WITH IDENTIFICATION INFORMATION "C001" |
| | C002 | PostScript COMPRESSION DATA ASSOCIATED WITH IDENTIFICATION INFORMATION "C002" |
| | C003 | PostScript COMPRESSION DATA ASSOCIATED WITH IDENTIFICATION INFORMATION "C003" |
| | ... | ... |
| G002 | C011 | PostScript COMPRESSION DATA ASSOCIATED WITH IDENTIFICATION INFORMATION "C0011" |
| | C012 | PostScript COMPRESSION DATA ASSOCIATED WITH IDENTIFICATION INFORMATION "C0012" |
| | C013 | PostScript COMPRESSION DATA ASSOCIATED WITH IDENTIFICATION INFORMATION "C0013" |
| | ... | ... |
| G003 | C021 | PostScript COMPRESSION DATA ASSOCIATED WITH IDENTIFICATION INFORMATION "C0021" |
| | C022 | PostScript COMPRESSION DATA ASSOCIATED WITH IDENTIFICATION INFORMATION "C0022" |
| | C023 | PostScript COMPRESSION DATA ASSOCIATED WITH IDENTIFICATION INFORMATION "C0023" |
| | ... | ... |
| ... | ... | ... |

442

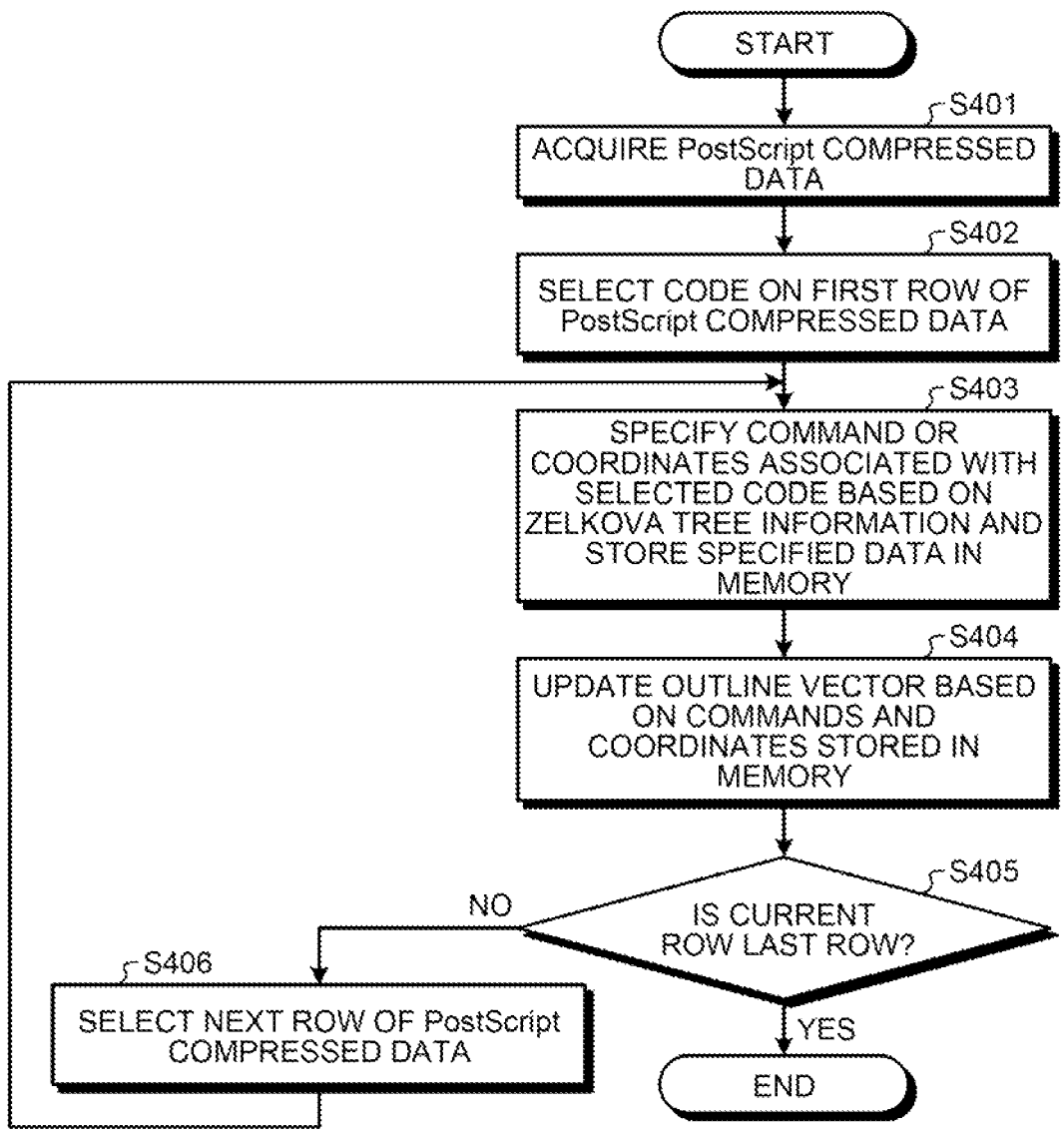

METHOD, MEDIUM, AND APPARATUS FOR SPECIFYING OBJECT INCLUDED IN IMAGE UTILIZING INVERTED INDEX

CROSS-REFERENCE TO RELATED APPLICATION

This application is a continuation application of International Application PCT/JP2018/022645 filed on Jun. 13, 2018 and designating U.S., the entire contents of which are incorporated herein by reference.

FIELD

The present invention relates to an acquiring method and the like.

BACKGROUND

Conventionally, in object recognition performed by using images, recognition is performed by drawing a plurality of teacher objects with respect to objects included in a captured image, and then narrowing down and specifying candidates. The teacher objects are described by a language called PostScript (trademark of Adobe Systems) capable of executing drawing instructions. In data generated by the description language, the drawing instructions that represent the shapes or the like of the objects in a page are described in an arbitrary order. In a description below, data generated by PostScript is referred to as "PostScript data".

Patent Literature 1: Japanese Laid-open Patent Publication No. 2002-015329

Patent Literature 2: Japanese National Publication of International Patent Application No. 2001-519986

However, in the conventional technology described above, there is a problem in that it is not possible to reduce the processing load applied to specify the object included in the captured image.

When an amount of PostScript data of the plurality of teacher objects is large, it takes much time to draw the shape of each of the objects by using the PostScript data. For example, the processing load is large in a case of drawing the shape of the objects are drawn by using the PostScript data and determining whether an object included in a certain captured image is associated with the objects in the PostScript data.

SUMMARY

According to an aspect of the embodiment of the invention, an acquiring method including: extracting, when a captured image captured by an image capturing device is acquired, based on the acquired captured image, a shape of an object included in the captured image, using a processor; generating, based on the extracted shape, text information that includes a drawing indication of the shape, using the processor; and acquiring, based on a storage unit that stores therein, regarding each of a plurality of objects, identification information on the objects in association with text information that includes a drawing indication of each of the objects, identification information on an object that is associated with text information in which similarity to the generated text information satisfies a criterion from among the plurality of objects, using the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating an example of a process of hashing the inverted index.

FIG. 11 is a functional block diagram illustrating a configuration of an information processing apparatus according to the embodiment.

FIG. 12 is a diagram illustrating an example of a data structure of an inverted index table according to the first embodiment.

FIG. 13 is a diagram illustrating an example of a process of restoring the inverted index.

FIG. 19 is a diagram illustrating an example of a data structure of an inverted index table according to the second embodiment.

FIG. 20 is a diagram illustrating an example of a data structure of Zelkova tree information according to the second embodiment.

FIG. 21 is a diagram illustrating an example of a data structure of a PostScript table according to the second embodiment.

FIG. 22 is a flowchart illustrating the flow of a process performed by an arithmetic unit according to the second embodiment.

DESCRIPTION OF EMBODIMENTS

Preferred embodiments of an acquiring method, a generating method, an acquiring program, a generating program, and an information processing apparatus disclosed in the present invention will be explained in detail below with reference to the accompanying drawings. Furthermore, the present invention is not limited to the embodiments.

First Embodiment

For example, a system according to a first embodiment includes a file generating device and an information processing apparatus. The file generating device generates an inverted index based on PostScript data. The information processing apparatus performs a process using the inverted index.

Figure 1:
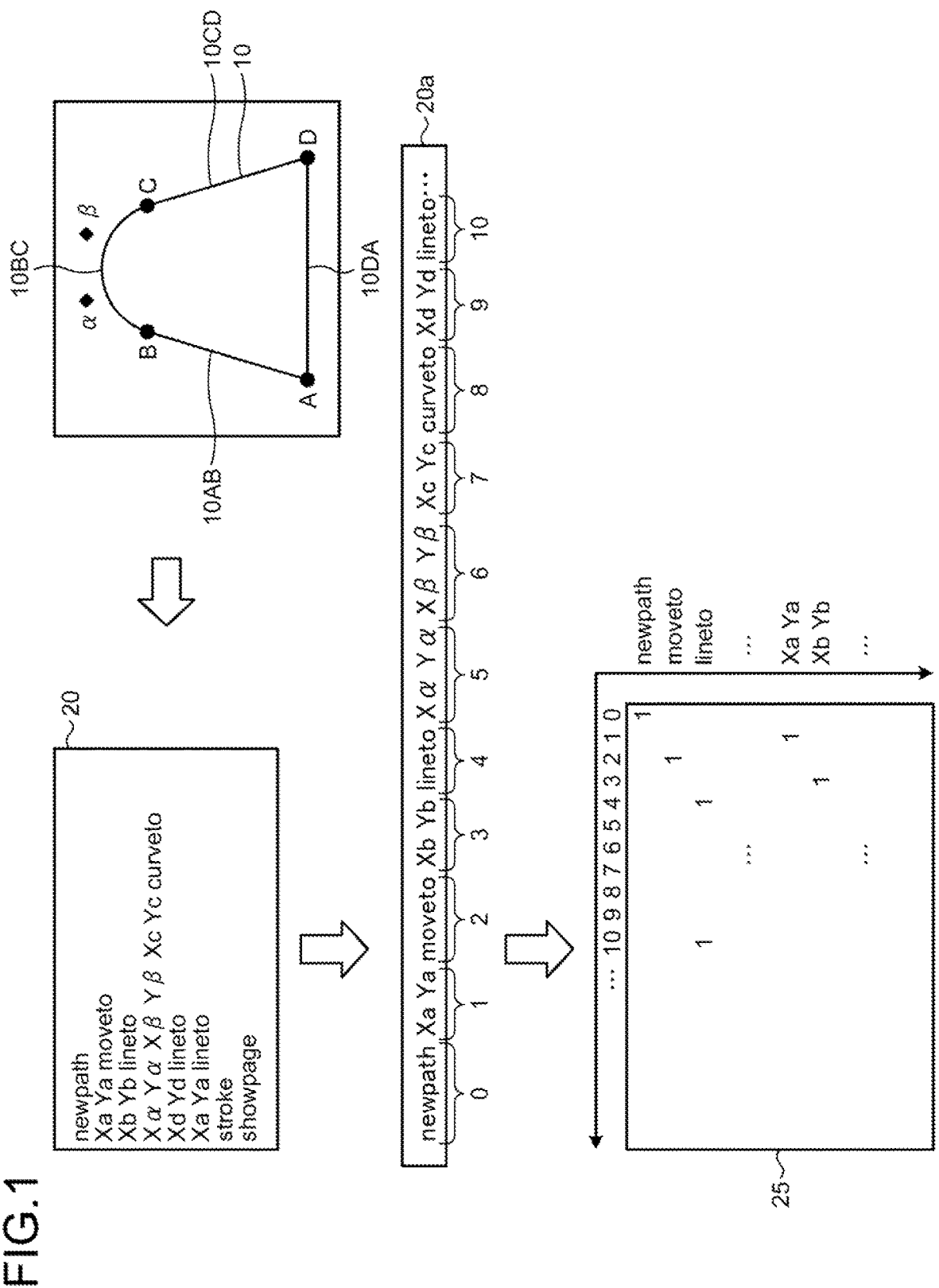
FIG. 1 is a diagram illustrating an example of a process of generating an inverted index of PostScript data.

FIG. 1 is a diagram illustrating an example of a process of generating an inverted index of PostScript data. In the example illustrated in FIG. 1, a case of generating PostScript data of an outline 10 will be described. The outline 10 is formed of a straight line 10AB, a curve 10BC, a straight line 10CD, and a straight line 10DA. The straight line 10AB is a straight line that connects a control point A and a control point B. The straight line 10CD is a straight line that connects a control point C and a control point D. The straight line 10DA is a straight line that connects a control point D and a control point A. The curve 10BC is a curve that connects the control point B and the control point C, and the shape of the curve is determined by control points α and β and the control points (end points) B and C.

The file generating device generates PostScript data 20 of the outline 10 based on the control points A, B, C, and D, and the control points α and β. The symbol denoted by "Xa, Ya" included in the PostScript data 20 indicates the coordinates of the control point A. The symbol denoted by "Xb, Yb" indicates the coordinates of the control point B. The symbol denoted by "Xc, Yc" indicates the coordinates of the control point C. The symbol denoted by "Xd, Yd" indicates the coordinates of the control point D. The symbol denoted by "Xα, Yα" indicates the coordinates of the control point α. The symbol denoted by "Xβ, Yβ" indicates the coordinates of the control point β. In the PostScript data 20, various kinds of commands "newpath moveto lineto curveto stroke showpage" are included. The commands are examples of a control sentence.

The file generating device generates PostScript conversion data 20a by sequentially reading character strings included in the PostScript data 20 from the upper portion and arranging the read character strings one after another.

The file generating device generates an inverted index 25 based on the relationships between commands or the coordinates of the PostScript conversion data 20a and appearance positions. The horizontal axis of the inverted index 25 is the axis associated with an offset. The vertical axis of the inverted index 25 is the axis associated with a command or the coordinates.

The offset indicates the position of the PostScript conversion data 20a from the top. The top offset in the PostScript conversion data 20a is set to "0" and, after that, 1 is added to the offset in unit of commands or coordinates. For example, in the PostScript conversion data 20a, offsets of "newpath", "Xa, Ya", and "moveto", . . . are "0", "1", and "2", . . . , respectively.

The file generating device scans the PostScript conversion data 20a and specifies the association relationship between the "offset" and the "command or the coordinates". The file generating device sets a flag "1" in the inverted index 25 based on the association relationship between the specified "offset" and the "command or the coordinates".

For example, because a command "newpath" appears in the offset "0" in the PostScript conversion data 20a, the file generating device sets the flag "1" at the position in which the offset "0" intersects the command "newpath" in the inverted index. The file generating device generates the inverted index 25 by repeatedly performing the process described above.

Figure 2:
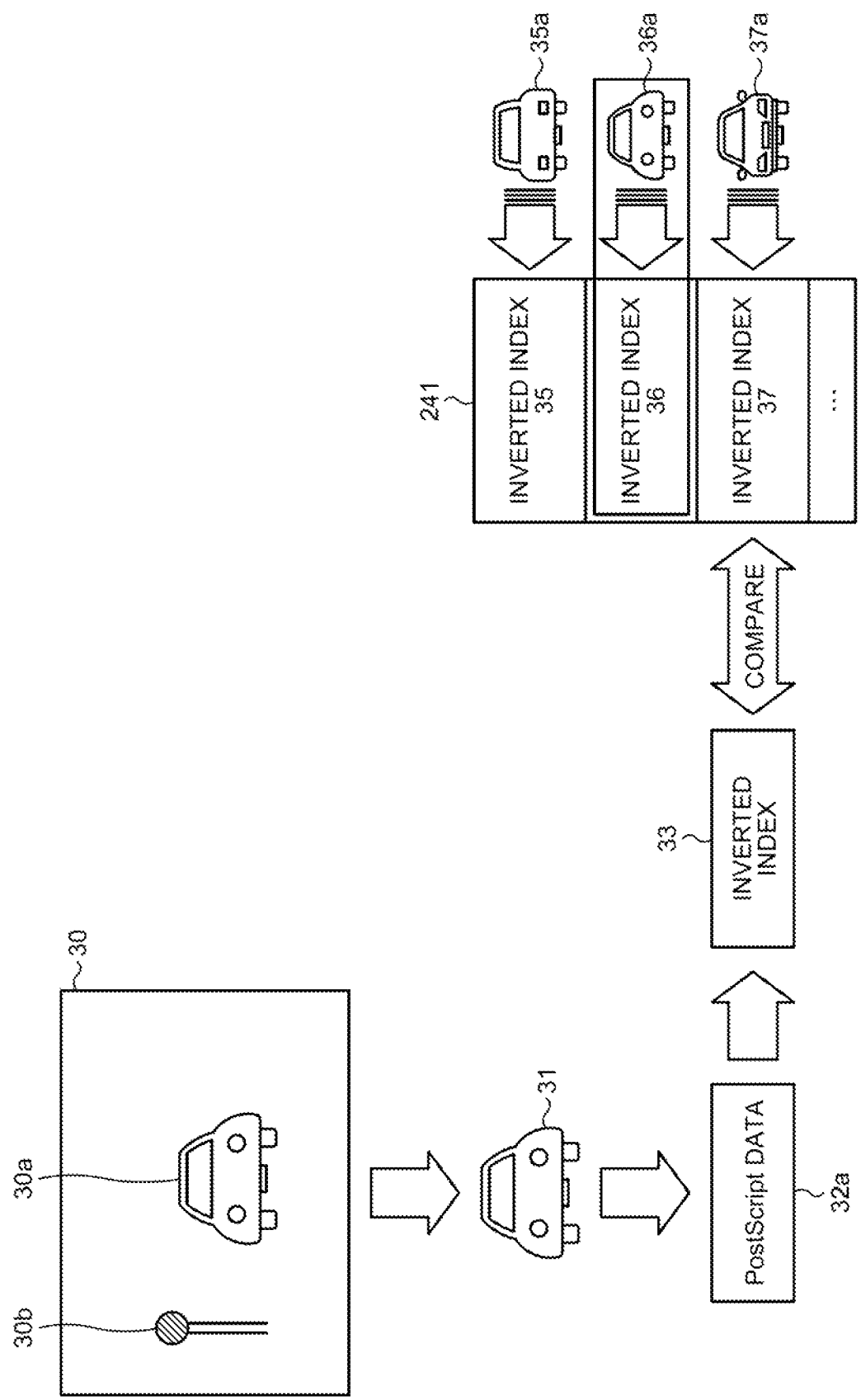
FIG. 2 is a diagram illustrating an example of a process according to a first embodiment.

FIG. 2 is a diagram illustrating an example of a process according to a first embodiment. The file generating device captures captured image data 30 by using a camera (stereo camera). For example, objects 30a and 30b are included in the captured image data 30. The file generating device specifies an objects 31 and an outline 32 by using parallax of a camera. For example, the file generating device generates the PostScript data 32a from the outline 32 of the object 31 by performing the process described in FIG. 1. Furthermore, the file generating device scans the PostScript data 32a and generates an inverted index 33 based on the relationship between the "offset" and the "comment or the coordinates". The file generating device transmits information on the inverted index 33 to the information processing apparatus.

The information processing apparatus includes an inverted index table 241 that stores therein information on the inverted index generated from a plurality of teacher objects. The information processing apparatus specifies, from the inverted index table 241, the inverted index in which the similarity to the inverted index 33 received from the file generating device satisfies the criterion. The information processing apparatus acquires and displays identification information of the object included in the specified inverted index.

For example, the information processing apparatus compares the inverted index 33 with inverted indexes 35, 35, and 37 stored in the inverted index table 241. The inverted index 35 is an inverted index generated based on the outline of an object 35a. An inverted index 36 is an inverted index generated based on the outline of an object 36a. The inverted index 37 is an inverted index generated based on the outline of an object 37a.

When the similarity between the inverted index 33 and the inverted index 36 satisfies the criterion, the information processing apparatus outputs the identification information on the object 36a that is associated with the inverted index 36. For example, when the match rate between the inverted index 33 and the inverted index 36 is greater than or equal to a predetermined threshold, the information processing apparatus determines that the similarity between the inverted index 33 and the inverted index 36 satisfies the criterion.

As described above, the file generating device according to the first embodiment generates PostScript data from the outline of the objects and generates an inverted index of the PostScript data. The information processing apparatus according to the first embodiment narrows down search targets by comparing the inverted index generated in the file generating device with the inverted indexes stored in the inverted index table. Consequently, it is possible to narrowing down the candidates and the search process at high speed without drawing an object by using the PostScript data. Furthermore, it is possible to speed up the processes by narrowing down the candidates by using the inverted index of the teacher object based on the commands or the coordinates of the PostScript data on the captured object, instead of comparing the captured object with each of the inverted indexes of the teacher objects.

Figure 3:
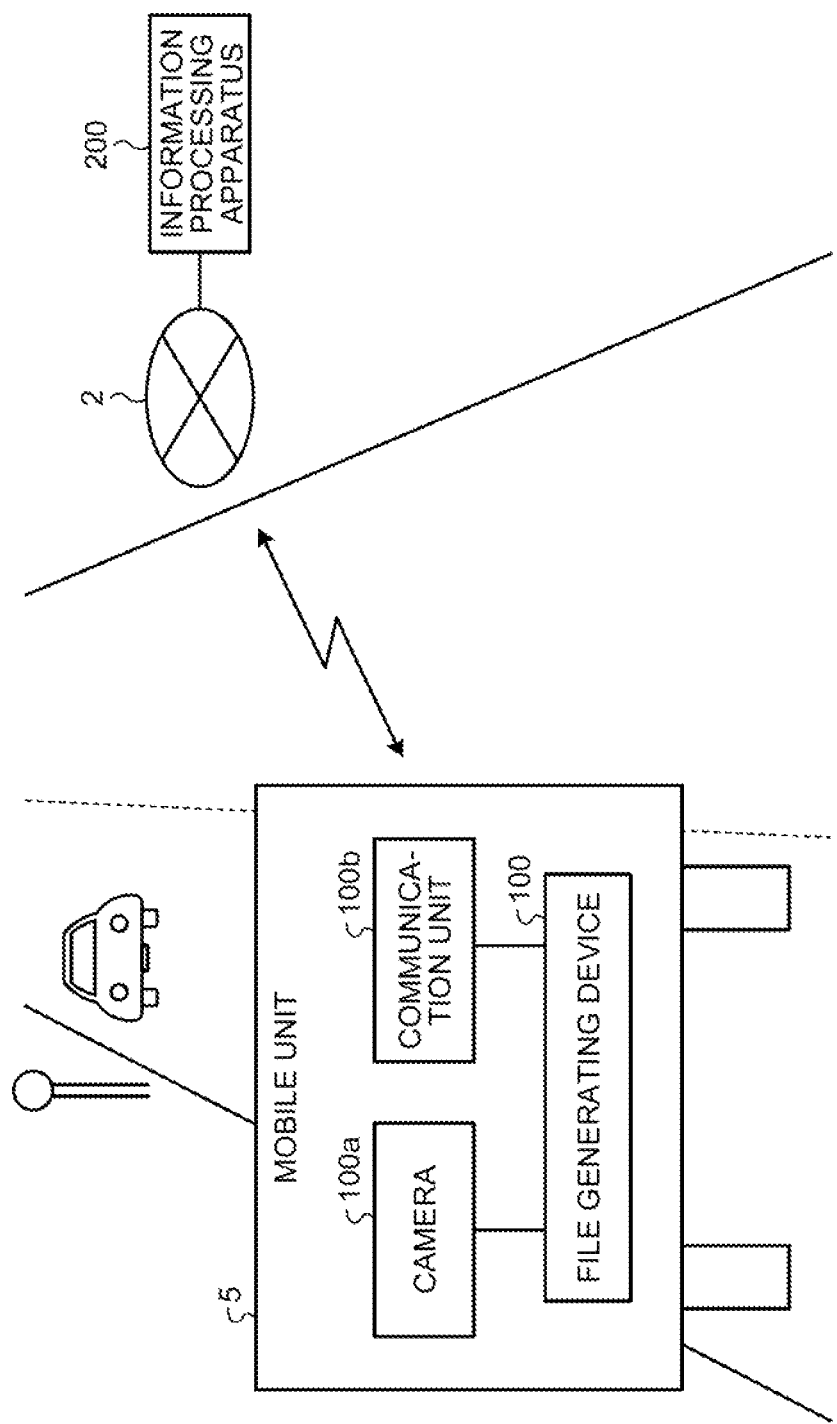
FIG. 3 is a functional block diagram illustrating a configuration of a system according to the first embodiment.

In the following, an example of a configuration of a system according to the first embodiment will be described. FIG. 3 is a functional block diagram illustrating a configuration of the system according to the first embodiment. As illustrated in FIG. 3, the system includes a file generating device 100 and an information processing apparatus 200. The file generating device 100 is connected to a camera 100a and a communication unit 100b. The file generating device 100, the camera 100a, and the communication unit 100b are mounted on a mobile unit 5.

The file generating device 100 is connected to a network 2 via the communication unit 100b and performs data communication with the information processing apparatus 200. The information processing apparatus 200 is connected to the network 2 and performs data communication with the file generating device 100. Furthermore, the file generating device 100 and the information processing apparatus 200 may also be directly connected in a wired manner and perform data communication.

The camera 100a is a stereo camera (binocular camera) that simultaneously captures objects from two different directions or is a monocular camera that can move from side to side, and can identify the outline of the objects based on parallax. The camera 100a outputs, to the file generating device 100, first captured image data captured from the first direction and second captured image data captured from the second direction that is different from the first direction. In a description below, the first captured image data and the second captured image data are collectively and appropriately referred to as captured image data.

The communication unit 100b is a communication device that is wirelessly connected to the network 2. The file generating device 100 is connected to the network 2 via the communication unit 100b.

The file generating device 100 is a device that generates PostScript data based on the outline of the objects included in the captured image data and that generates inverted indexes from the PostScript data. The file generating device 100 transmits information on a compressed file including the inverted indexes or the like to the information processing apparatus 200.

When the information processing apparatus 200 receives the information on the compressed file from the file generating device 100, the information processing apparatus 200 compares the inverted index with the inverted index table included in the compressed file. The information processing apparatus 200 specifies, from among the inverted indexes included in the inverted index table, the inverted index in which similarity to the inverted index included in the compressed file satisfies the criterion.

Figure 4:
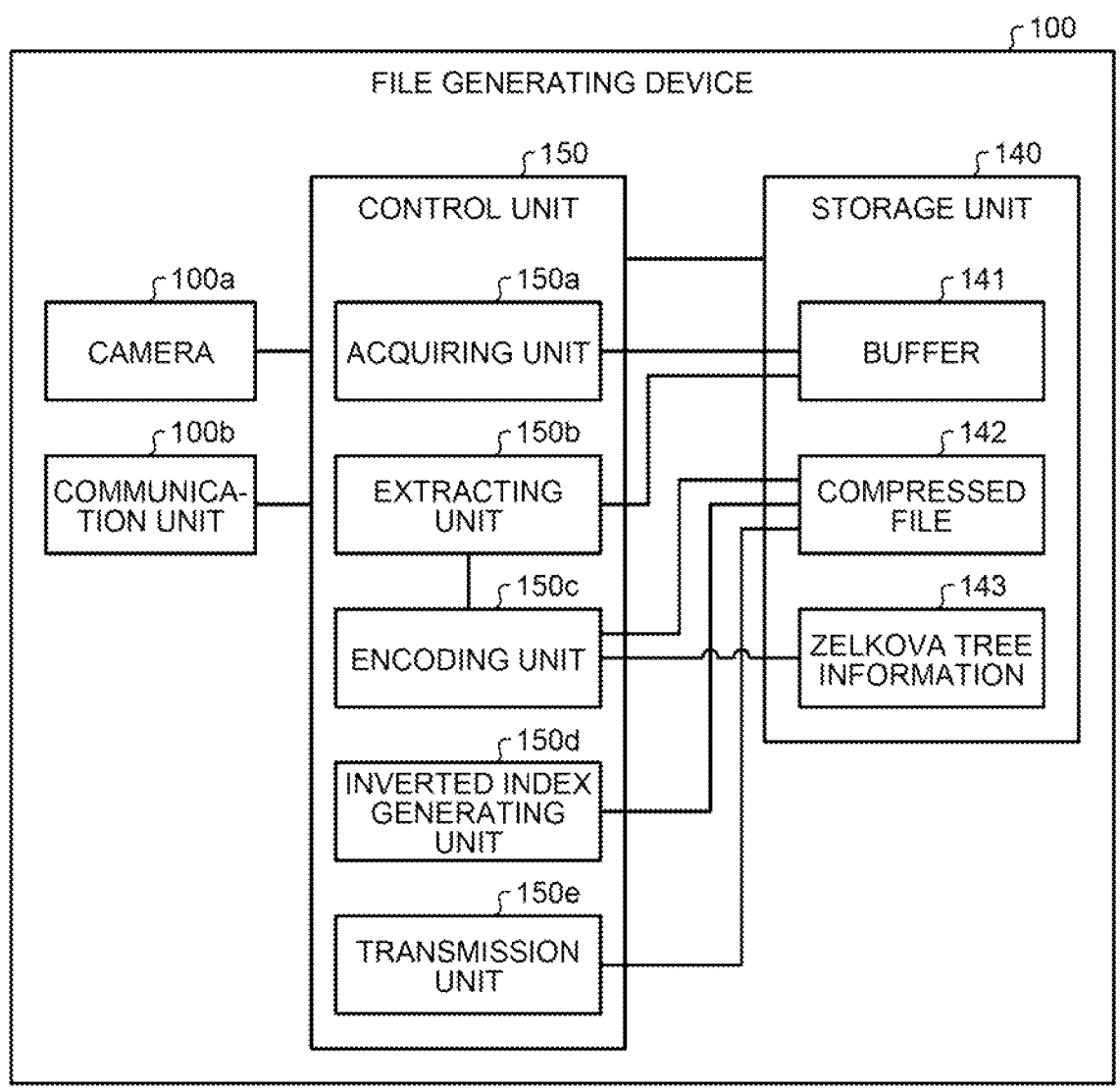
FIG. 4 is a functional block diagram illustrating a configuration of a file generating device according to the first embodiment.

In the following, an example of a configuration of the file generating device according to the first embodiment will be described. FIG. 4 is a functional block diagram illustrating a configuration of the file generating device according to the first embodiment. As illustrated in FIG. 4, the file generating device includes the camera 100a, the communication unit 100b, a storage unit 140, and a control unit 150. The explanations related to the camera 100a and the communication unit 100b are the same as those explained with reference to FIG. 3.

The storage unit 140 includes a buffer 141, a compressed file 142, and Zelkova tree information 143. The storage unit 140 corresponds to a semiconductor memory device, such as a random access memory (RAM), a read only memory (ROM), and a flash memory, or a storage device, such as a hard disk drive (HDD).

Figures 5, 6:
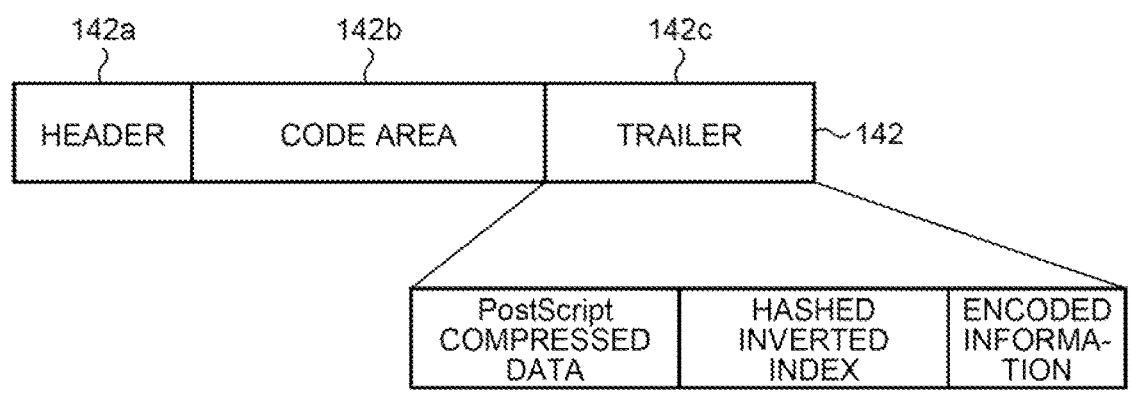
FIG. 5 is a diagram illustrating an example of a data structure of a buffer.
FIG. 6 is a diagram illustrating an example of a data structure of a compressed file.

The buffer 141 is a buffer that holds the first captured image data and the second captured image data. FIG. 5 is a diagram illustrating an example of a data structure of the buffer. As illustrated in FIG. 5, the buffer 141 includes tables 141a and 141b.

The table 141a is a table that holds time at which the first captured image data is captured and the first captured image data in association with each other. The table 141b is a table that holds time at which the second captured image data is captured and the second captured image data in association with each other.

FIG. 6 is a diagram illustrating an example of a data structure of the compressed file. As illustrated in FIG. 6, the compressed file 142 includes a header 142a, a code area 142b, and a trailer 142c. In the header 142a, various kinds of control information is stored. In the code area 142b, information obtained by encoding the captured image data is stored.

In the trailer 142c, PostScript compressed data, a hashed inverted index, encoded information, and the like are stored. The PostScript compressed data is a compressed PostScript data. The hashed inverted index is an inverted index that has been hashed. The encoded information is information in which the order of encoding, a code of rear dither image data, and outline information are associated, which is generated by a process that will be described later in FIG. 7.

The Zelkova tree information 143 is information that associates an image of the blocks obtained by dividing the captured image data with a code. A Zelkova tree is also called a neural tree.

A description will be given here by referring back to FIG. 4. The control unit 150 includes an acquiring unit 150a, an extracting unit 150b, an encoding unit 150c, an inverted index generating unit 150d, and a transmission unit 150e. The control unit 150 can be implemented by a central processing unit (CPU), a micro processing unit (MPU), or the like. Furthermore, the control unit 150 can also be implemented by hard-wired logic, such as an application specific integrated circuit (ASIC) or a field programmable gate array (FPGA).

The acquiring unit 150a acquires the first captured image data from the camera 100a, associates the time with the first captured image data, and stores the associated information in the buffer 141. The acquiring unit 150a acquires the second captured image data from the camera 100a, associates the time with the second captured image data, and stores the associated information in the buffer 141.

The extracting unit 150b is a processing unit that extracts the object shape of the captured image data based on the first captured image data and the second captured image data and based on the principle of the stereo camera. The extracting unit 150b outputs the captured image data and the information on the object shape to the encoding unit 150c.

Figure 7:
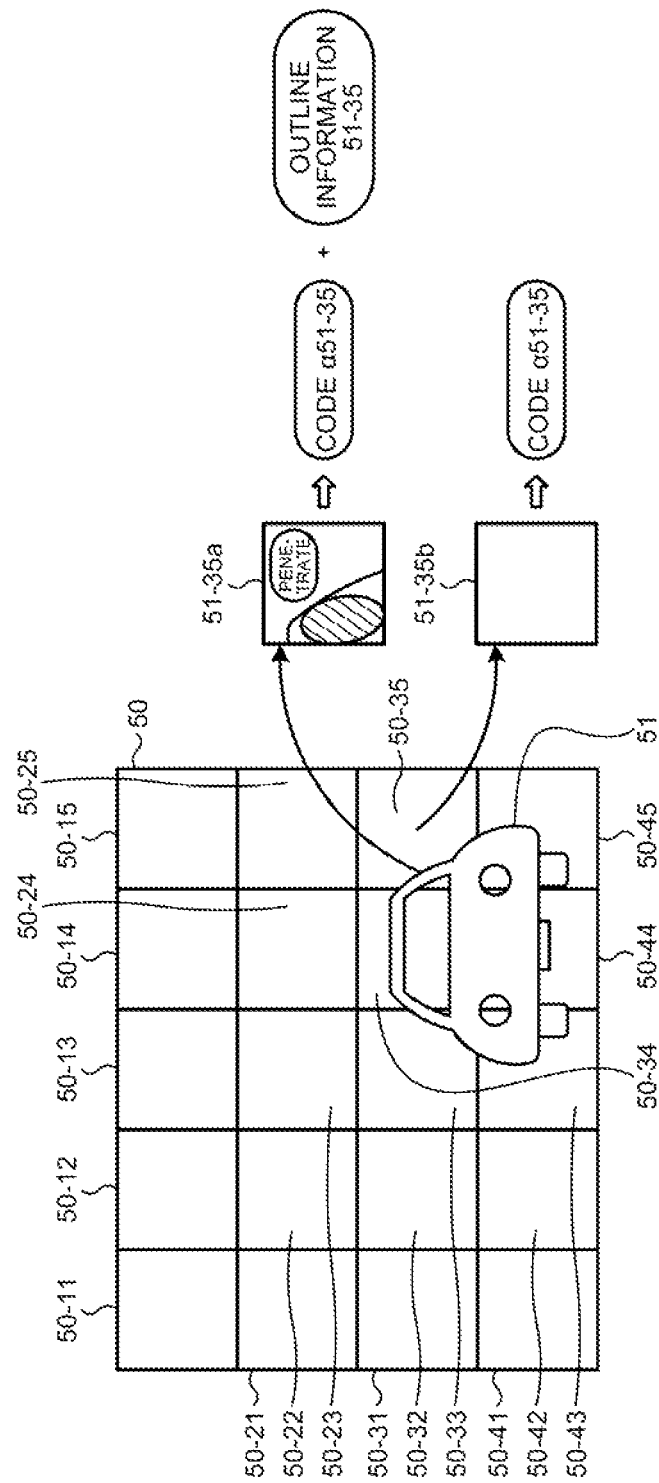
FIG. 7 is a diagram illustrating a process performed by an encoding unit.

The encoding unit 150c is a processing unit that encodes the captured image data. FIG. 7 is a diagram illustrating a process performed by the encoding unit. In a description in FIG. 7, it is assumed that an object 51 is included in captured image data 50.

The encoding unit 150c divides the captured image data 50 into a plurality of blocks 50-11 to 50-45. The encoding unit 150c specifies, based on the position of the object 51, the block that includes the object 51 from among the plurality of the blocks 50-11 to 50-45.

In a description below, when particularly distinguishing the blocks, the blocks that include the object 51 are referred to as a "first type block". The blocks that do not include the object 51 are referred to as a "second type block".

In the example illustrated in FIG. 7, the first type block is blocks 50-33, 50-34, 50-35, 50-43, 50-44, and 50-45. The other blocks that do not correspond to the first type block is the second type block.

An example of the process in which the encoding unit 150c encodes (compresses) the first type block will be described. Here, the process in which the encoding unit 150c encodes the block 50-35 will be described.

The encoding unit 150c generates front dither image data 51-35a and rear dither image data 51-35b based on the block 50-35.

The front dither image data 51-35a is image data that includes only the object 51. For example, the encoding unit 150c generates the front dither image data 51-35a by performing a process of leaving, in the area of the block 50-22, the area of the object 51, and penetrating the other areas, and performing dithering on the processed block 50-35.

The rear dither image data 51-35b is image data that does not include a subject 31. For example, the encoding unit 150c performs a process of excluding, in the area of the block 50-35, the area of the object 51 and compensating the pixel values of the excluded area by the pixel value of the other area (for example, the area or the background of the object 51). The encoding unit 150c generates the rear dither image data 51-35b by performing dithering on the processed block 50-35.

The encoding unit 150c assigns a code α51-22 to the front dither image data 51-22a and generates outline information 51-22. For example, the encoding unit 150c selects a single code from among a plurality of unassigned codes α51-$n$ and assigns the selected code to the front dither image data 51-35a. The outline information 51-35 is information that indicates the shape of the outline of the object 51 included in the front dither image data 51-35a.

Furthermore, the encoding unit 150c assigns a code β51-35 to the rear dither image data 51-35b. For example, the encoding unit 150c selects a single code from among a plurality of unassigned codes β51-$n$ and assigns the selected code to the rear dither image data 51-35b.

The encoding unit 150c registers the information in which the front dither image data 51-35a is associated with the code α51-35 in the Zelkova tree information 143. The encoding unit 150c registers the information in which the rear dither image data 51-35b is associated with the code β51-35 in the Zelkova tree information 143.

The encoding unit 150c stores, in the order in which blocks are encoded, the code α51-35 of the front dither image data 51-35a in the code area 142b in the compressed file 142. As will be described in FIG. 8 later, for example, because the block 50-35 is encoded for the $19^{th}$ time, the encoding unit 150c stores the code α51-35 in the $19^{th}$ code area. Furthermore, the encoding unit 150c associates the encoding order, the code β51-35 of the rear dither image data 51-35b, and the outline information and stores the associated information in the trailer 142c.

The process in which the encoding unit 150c encodes the other first type block is the same as the process of encoding the block 50-35 described above. The encoding unit 150c generates, regarding each of the first type block, the front dither image data and the rear dither image data, assigns codes, and generates outline information. Furthermore, the encoding unit 150c updates the Zelkova tree information 143 and information in the compressed file 142.

In the following, an example of a process in which the encoding unit 150c encodes (compresses) the second type block will be described. Here, a process in which the encoding unit 150c encodes the block 50-11 will be described.

The encoding unit 150c generates dither image data 51-11 by performing dithering on the block 50-11 without processing anything. The encoding unit 150c assigns the dither image data 51-11 to the code γ51-11. The encoding unit 150c registers, in the Zelkova tree information 143, the information in which the dither image data 51-11 is associated with the code γ51-11.

The process in which the encoding unit 150c encodes the other second type block is the same as the process of encoding the block 50-11 described above.

Here, each of the codes is characterized such that the encoding unit 150c can identify the codes to be assigned to the front dither image data in the first type block and the codes to be assigned to the dither image data in the second type block. For example, the encoding unit 150c may also unify the top n bits of the code to be assigned to the front dither image data by a predetermined bit string. Alternatively, the encoding unit 150c may also unify the top n bits of the code of the dither image data in the second type block by a predetermined bit string.

The encoding unit 150c encodes each of the blocks 50-11 to 50-45 in accordance with a predetermined order that has previously been defined, which will be described later with reference to FIG. 8, and then sequentially stores the codes and the outline information in the compressed file 142.

Figure 8:
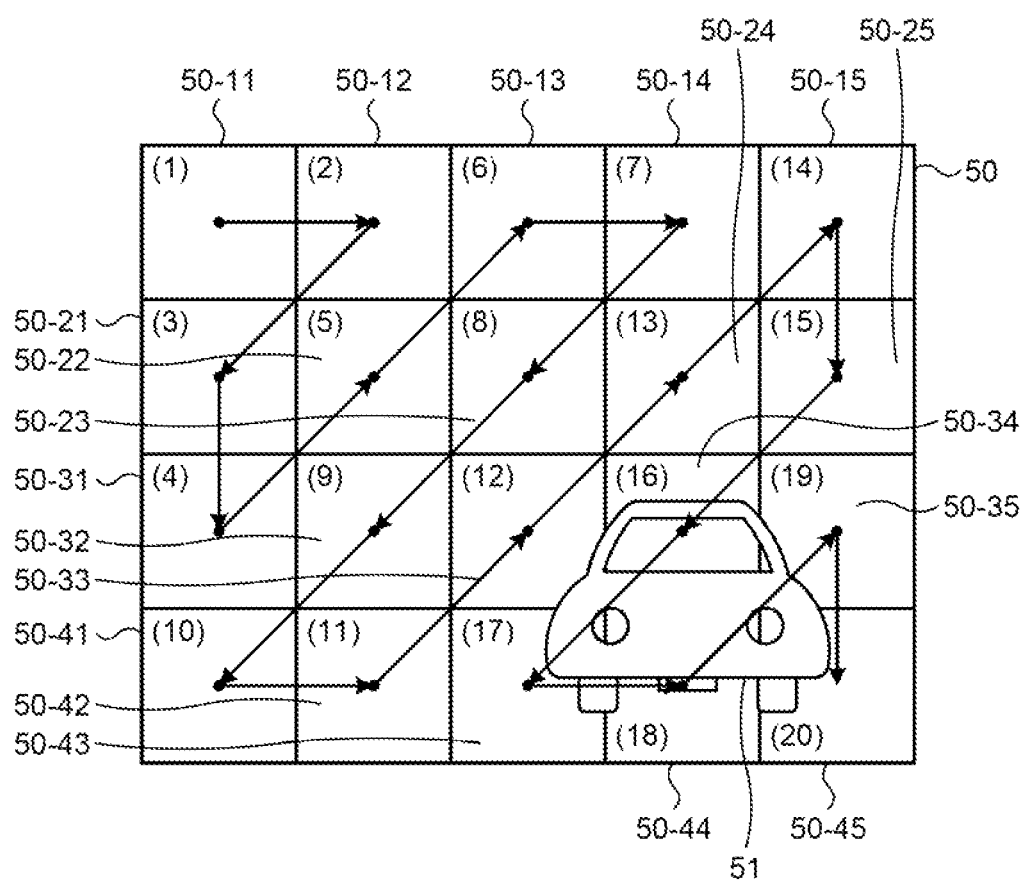
FIG. 8 is a diagram illustrating an example of the order of encoding performed by the encoding unit.

FIG. 8 is a diagram illustrating an example of the order of encoding performed by the encoding unit. The encoding unit 150c encodes each of the blocks in the order illustrated in FIG. 8 and stores the codes assigned to each of the blocks in the code area 142b. In the example illustrated in FIG. 8, the encoding unit 150c stores the blocks in the order of the blocks 50-11, 50-12, 50-21, 50-31, 50-22, 50-13, 50-14, 50-23, 50-32, 50-41, 50-42, 50-33, 50-24, 50-15, 50-25, 50-34, 50-43, 50-44, 50-35, and 50-45.

For example, the encoding unit 150c encodes the block (the first type block) 50-35 for the $19^{th}$ time. Consequently, the encoding unit 150c stores the code α51-35 assigned to the front dither image data associated with the block 50-35 in the $19^{th}$ area in the code area 142b.

It is assumed that, when the encoding unit 150c stores a code of the rear dither image data included in the first type block and the outline information in the trailer 142c, the encoding unit 150c associates the codes and the outline information with the order in which the subject first type block is encoded. For example, the block (the first type block) 50-35 is encoded for the $19^{th}$ time. Consequently, the encoding unit 150c associates the order of "19", the code β51-35 assigned to the rear dither image data, and the outline information 51-35 with each other, and then stores the associated information in the trailer 142c.

As described above, the encoding unit 150c divides the captured image data 50 into a plurality of blocks, scans the blocks in a predetermined order, encodes each of the blocks, and sequentially stores the codes in the code area 142b in the compressed file 142 in the order in which the blocks are encoded. Here, when the blocks targeted for encoding are the first type block, the encoding unit 150c performs a process of assigning the codes that can be distinguished from the codes of the second type block, associating the outline information on the subject included in the first type block with the order in which the blocks are encoded, and storing the associated information in the trailer 142c. Consequently, it is possible to specify the blocks that include the outline of the subject by scanning the code area 142b without decoding the codes stored in the code area 142b and generating the captured image data 50 and it is thus possible to easily regenerate the outline of the subject by acquiring the outline information associated with the specified blocks from the trailer 142c.

A description will be given here by referring back to FIG. 4. The inverted index generating unit 150d is a processing unit that generates the PostScript data from the outline of the object and that generates the inverted index of the generated PostScript data. The inverted index generating unit 150d is an example of a generating unit.

The inverted index generating unit 150d may also specify the outline based on the object shape extracted from the extracting unit 150b or may also specify the outline based on the compressed file 142. Here, as an example, a description will be given of a case in which the inverted index generating unit 150d performs a process of extracting the outline of the object based on the compressed file 142.

Figure 9:
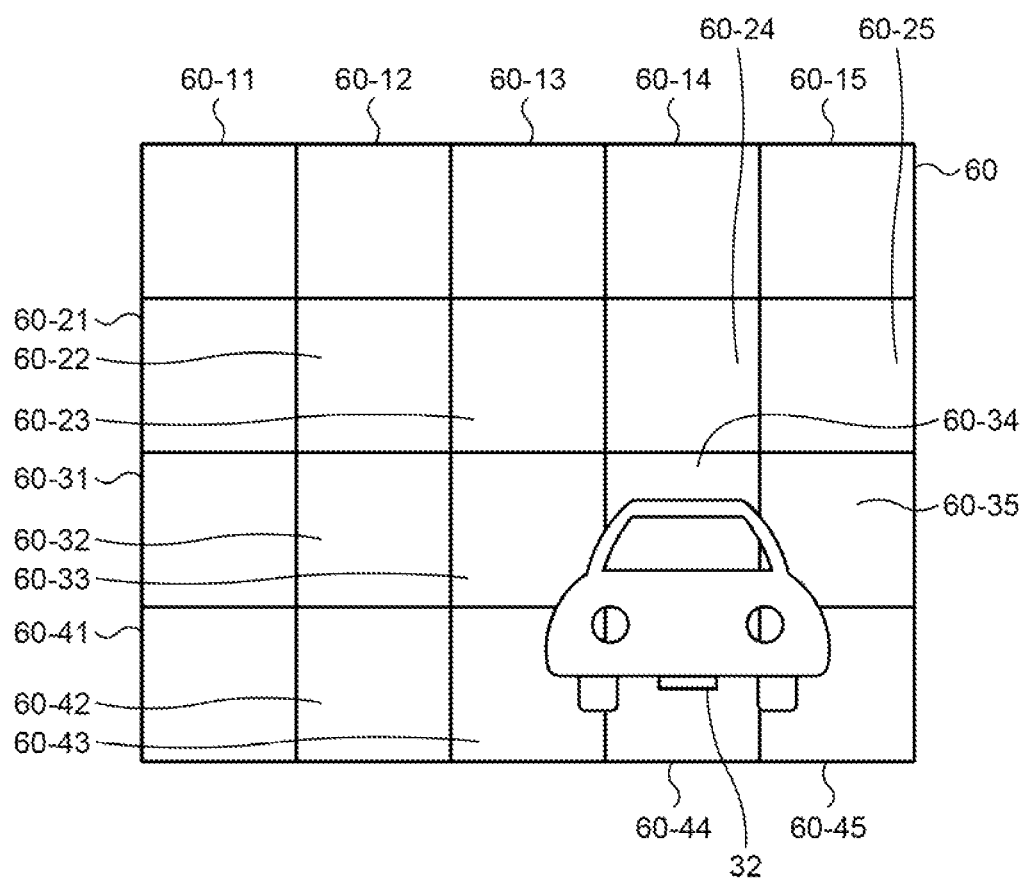
FIG. 9 is a diagram illustrating a process of extracting an outline.

FIG. 9 is a diagram illustrating a process of extracting an outline. The inverted index generating unit 150d generates extracted image data 60 and generates a plurality of blocks 60-11 to 60-45. It is assumed that the number of the blocks 60-11 to 60-45 is the same as the number of the blocks 50-11 to 50-45 in the captured image data 50 described with reference to FIG. 7. Furthermore, it is assumed that, in the initial extracted image data 60, the outline 32 is not extracted.

The inverted index generating unit 150d scans the code area 142b in the compressed file 142 in order and specifies the code assigned to the front dither image data in the first type block. The inverted index generating unit 150d specifies the blocks that include the outline of the object from the blocks 60-11 to 60-45 by using, as a key, the order in which the codes assigned to the front dither image data in the first type blocks are stored.

For example, it is assumed that the order in which the codes assigned to the front dither image data in the first type block are stored in the code area is 12, 16, 17, 18, 19, and 20 and it is assumed that each of the blocks is encoded in the order described with reference to FIG. 8. In this case, the inverted index generating unit 150d specifies that the blocks that include the outline of the object are the blocks 60-33, 60-34, 60-43, 60-44, 60-35, and 60-45.

The inverted index generating unit 150d acquires the outline information associated with the order of 12, 16, 17, 18, 19, and 20 from the trailer 142c in the compressed file 142 and sets the outline included in each of the blocks. For example, it is assumed that the pieces of outline information associated with the order of 12, 16, 17, 18, 19, and 20 are pieces of outline information 51-33, 51-34, 51-43, 51-44, 51-35, and 51-45. The outline information 51-35 has been described with reference to FIG. 7 but descriptions of the other pieces of outline information will be omitted.

The inverted index generating unit 150d extracts the outline 32 by combining the set pieces of the outline information 51-33, 51-34, 51-43, 51-44, 51-35, and 51-45.

In the following, a process in which the inverted index generating unit 150d generates the PostScript data based on the information on the outline will be described. The inverted index generating unit 150d recognizes the outline 32 as a combination between a plurality of the straight lines and curves (Bezier curves); specifies a control point that indicates an endpoint of each of the straight lines, a control point that indicates an endpoint of a curve, and a control point that determines the shape of the curve; and generates PostScript data. Any conventional technology may also be used for the process of generating the PostScript data from the outline 32 performed by the inverted index generating unit 150d.

After having generated the PostScript data, the inverted index generating unit 150d generates the inverted index in the processing procedure described with reference to FIG. 1. For example, the inverted index generating unit 150d generates the PostScript conversion data by sequentially reading a character string included in the PostScript data from the upper portion and arranging the character strings one after another. The inverted index generating unit 150d generates the inverted index based on the relationship between the command or the coordinates of the PostScript conversion data and the appearance position.

Figure 10:
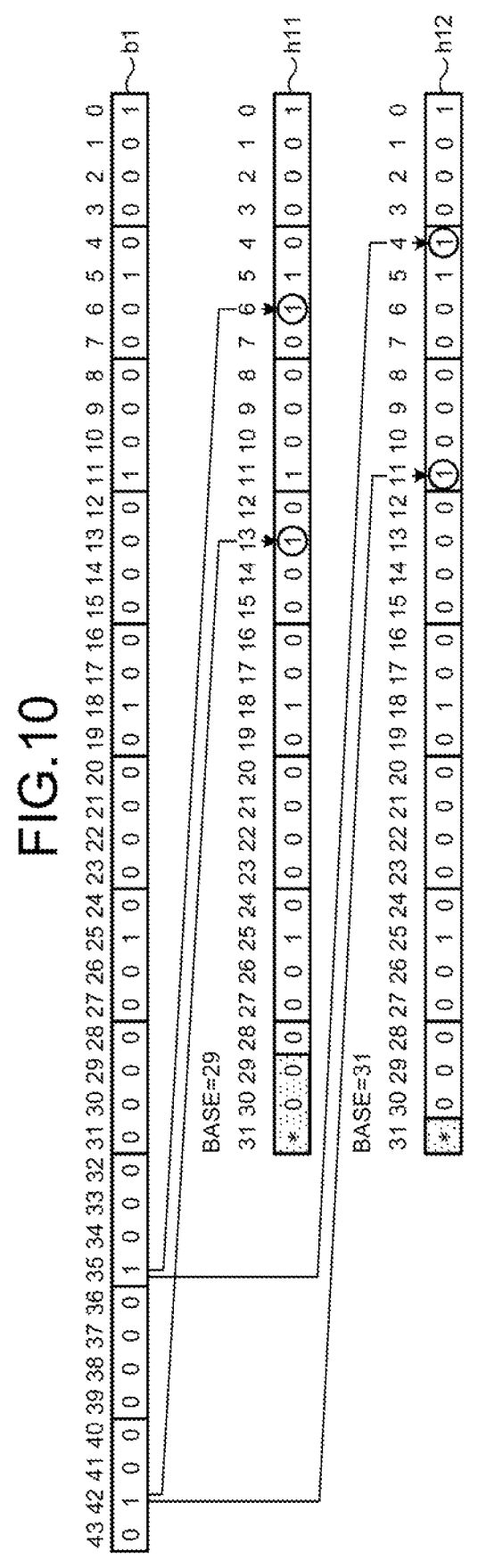

After having generated the inverted index, the inverted index generating unit 150d may also hash, by using a returning technology of bitmaps, the inverted index by prime numbers (bases) and reduce the size. FIG. 10 is a diagram illustrating an example of a process of hashing the inverted index.

In the example described with reference to FIG. 10, a 32-bit register is assumed to be used and the bitmap of each row of the inverted index based on the prime numbers (bases) of "29" and "31". Here, a description will be given of a case of generating a hashed bitmap h11 and a hashed bitmap h12 from a bitmap b1.

It is assumed that the bitmap b1 is a bitmap obtained by extracting a certain row of the inverted index (for example, the inverted index 25 illustrated in FIG. 1). The hashed bitmap h11 is the bitmap hashed by the base "29". The hashed bitmap h12 is the bitmap hashed by the base "31".

The inverted index generating unit 150d associates a value of remainder obtained by dividing the position of each of the bits in the bitmap b1 by a single base with the position of the hashed bitmap. When "1" is set at the position of the bit of the subject bitmap b1, the inverted index generating unit 150d performs a process of setting "1" to the position of the associated hashed bitmap.

A description will be given of an example of a process of generating the hashed bitmap h11 of the base "29" from the bitmap b1. First, the inverted index generating unit 150d copies the information on the position of the bits "0 to 28" in the bitmap b1 to the hashed bitmap h11. Then, because the remainder obtained by dividing the position of the bit "35" in the bitmap b1 by the base "29" is "6", the position "35" in the bitmap b1 is associated with the position "6" in the hashed bitmap h11. Because "1" is set to the position "35" in the bitmap b1, the inverted index generating unit 150d sets "1" to the position "6" in the hashed bitmap h11.

Because the remainder obtained by dividing the position of the bit "42" in the bitmap b1 by the base "29" is "13", the position "42" in the bitmap b1 is associated with the position "13" in the hashed bitmap h11. Because "1" is set to the position "42" in the bitmap b1, the inverted index generating unit 150d sets "1" to the position "13" in the hashed bitmap h11.

Regarding the positions after the position "29" in the bitmap b1, the inverted index generating unit 150d generates the hashed bitmap h11 by repeatedly performs the process described above.

An example of a process of generating the hashed bitmap h12 of the base "31" from the bitmap b1 will be described. First, the inverted index generating unit 150d copies the information on the positions "0 to 30" in the bitmap b1 to the hashed bitmap h12. Then, because the remainder obtained by dividing the position of the bit "35" in the bitmap b1 by the base "31" is "4", the position "35" in the bitmap b1 is associated with the position "4" in the hashed bitmap h12. Because "1" is set to the position "35" in the bitmap b1, the inverted index generating unit 150d sets "1" to the position "4" in the hashed bitmap h12.

Because the remainder obtained by dividing the position of the bit "42" in the bitmap b1 by the base "31" is "11", the position "42" in the bitmap b1 is associated with the position "11" in the hashed bitmap h12. Because "1" is set to the position "42" in the bitmap b1, the inverted index generating unit 150d sets "1" to the position "11" in the hashed bitmap h12.

Regarding the positions after the position "31" in the bitmap b1, the inverted index generating unit 150d generates the hashed bitmap h12 by repeatedly performing the process described above.

The inverted index generating unit 150d generates the hashed inverted index by compressing each of the rows in the inverted index by using the returning technology described above. Furthermore, information on the row (command or coordinates) of the bitmap of the generation source is added to the hashed bitmap of the bases "29" and "31". The inverted index generating unit 150d stores the information on the hashed inverted index in the trailer 142c in the compressed file 142.

The inverted index generating unit 150d encodes the PostScript data and generates the PostScript compressed data. For example, the inverted index generating unit 150d encodes, by using dictionary information (not illustrated), the PostScript data in units of commands and in units of coordinates. The inverted index generating unit 150d stores the PostScript compressed data in the trailer 142c in the compressed file 142.

Here, the dictionary information is data that holds information on a static dictionary and a dynamic dictionary. The static dictionary is data in which words are associated with static codes. The dynamic dictionary holds data in which, when a unique dynamic code is assigned to a word that is not present in the static dictionary, the subject word is associated with a dynamic code. For example, in the static dictionary, commands or the coordinates that are used by the PostScript data may also be associated with the static codes, or, by using dynamic dictionary, unique dynamic codes may also be associated with the commands or the coordinates that are used by the PostScript data. In a description of the embodiments, the static codes and the dynamic codes are correctively and simply referred to as "codes".

For example, the inverted index generating unit 150d generates the PostScript compressed data by performing a process of sequentially reading the commands or the coordinates of the PostScript data from the top, comparing the read commands or the coordinates with the dictionary information, and assigning a code to each of the commands and the coordinates.

The transmission unit 150e is a processing unit that transmits the compressed file 142 stored in the storage unit 140 to the information processing apparatus 200.

In the following, a configuration of the information processing apparatus 200 according to the first embodiment will be described. FIG. 11 is a functional block diagram illustrating a configuration of an information processing apparatus according to the embodiment. As illustrated in FIG. 11, the information processing apparatus 200 includes a communication unit 210, an input unit 220, a display unit 230, a storage unit 240, and a control unit 250.

The communication unit 210 is a processing unit that performs data communication with the file generating device 100 via the network 2. The communication unit 210 is an example of a communication device. For example, the communication unit 210 receives the compressed file 142 from the file generating device 100 and outputs the received compressed file 142 to the control unit 250.

The input unit 220 is an input device for inputting various kinds of data to the information processing apparatus 200. For example, the input unit 220 corresponds to a keyboard, a mouse, a touch panel, or the like.

The display unit 230 is a display device for displaying various kinds of information output from the control unit 250. For example, the display unit 230 corresponds to a liquid crystal display, a touch panel, or the like.

The storage unit 240 includes the compressed file 142 and the inverted index table 241. The storage unit 240 corresponds to a semiconductor memory device, such as a RAM, a ROM, a flash memory, or the like or a storage device, such as an HDD or the like.

The compressed file 142 is a compressed file generated by the file generating device 100. The data structure of the compressed file 142 is the same as the data structure of the compressed file 142 described with reference to FIG. 6.

The inverted index table 241 is a table that holds information on the inverted index generated from each of the outlines of various kinds of the object shapes. FIG. 12 is a diagram illustrating an example of a data structure of an inverted index table according to the first embodiment. As illustrated in FIG. 12, the inverted index table 241 associates identification information, an inverted index, and additional information with each other.

The identification information is information for uniquely identifying an object. The inverted index is an inverted index generated based on the outline of the object identified by the identification information. The additional information indicates additional information related to an object identified by the identification information. For example, when the object identified by the identification information is a vehicle, the manufacturer of the vehicle, the specifications of the vehicle, and the like are registered as the additional information.

A description will be given here by referring back to FIG. 11. The control unit 250 includes an acquiring unit 251, a restoring unit 252, and a specifying unit 253. The control unit 250 can be implemented by a CPU, an MPU, and the like. Furthermore, the control unit 250 can be implemented by hard-wired logic, such as an ASIC, or an FPGA.

The acquiring unit 251 is a processing unit that acquires the compressed file 142 from a file generating device 100. The acquiring unit 251 stores the acquired compressed file 142 in the storage unit 240.

The restoring unit 252 is a processing unit that restores the hashed inverted index stored in the compressed file 142 to the inverted index. The restoring unit 252 outputs the restored inverted index to the specifying unit 253.

Figure 13:
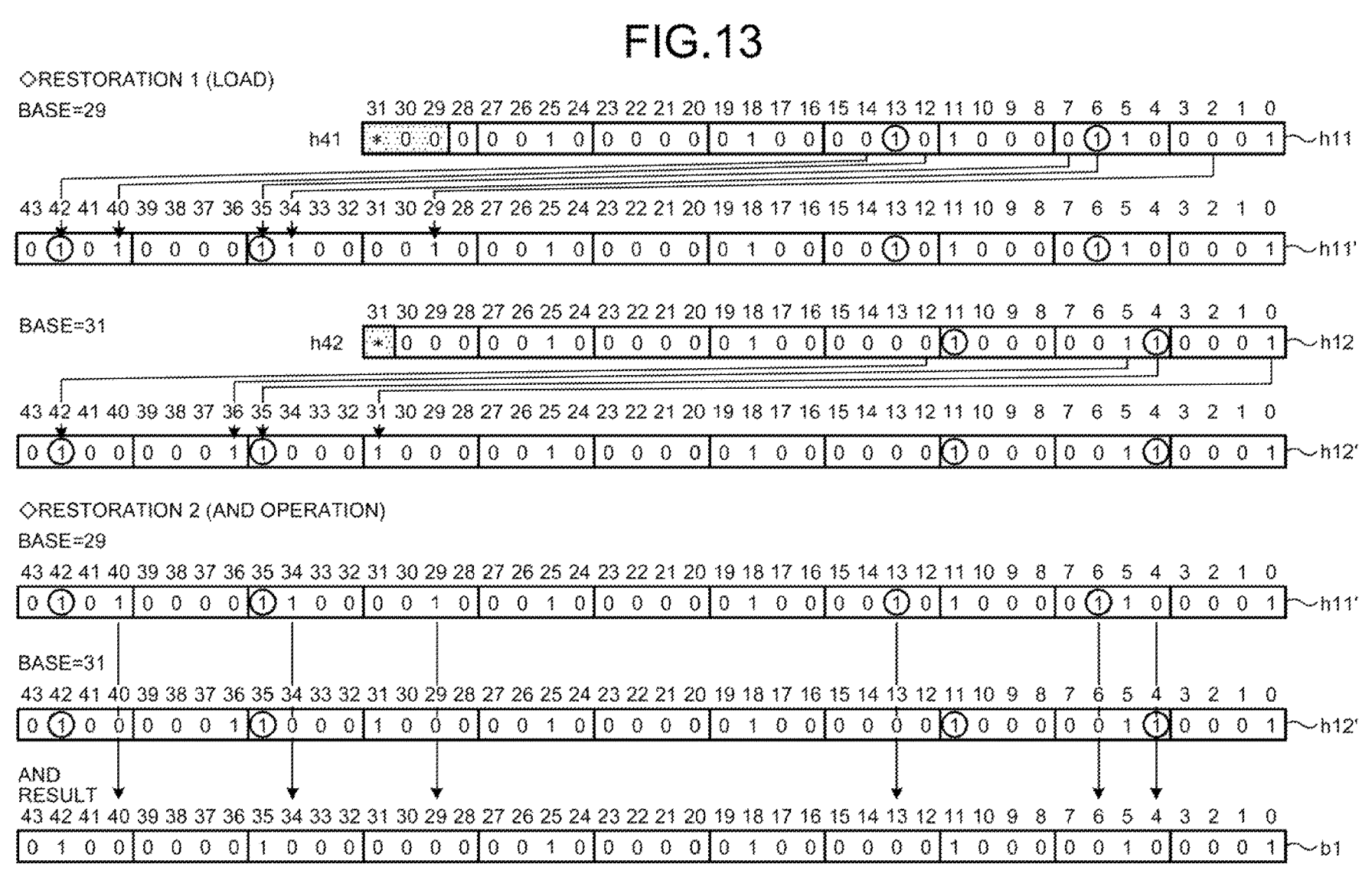

FIG. 13 is a diagram illustrating an example of a process of restoring the inverted index. Here, as an example, a case in which the restoring unit 252 restores the bitmap b1 based on the hashed bitmap h11 and the hashed bitmap h12 will be described.

The restoring unit 252 generates an intermediate bitmap h11' from the hashed bitmap h11 of the base "29". The restoring unit 252 copies the values of the positions 0 to 28 in the hashed bitmap h11 to the positions 0 to 28 in the intermediate bitmap, respectively.

Regarding the positions after the position 29 in the intermediate bitmap h11', the restoring unit 252 repeatedly performs the process of copying each of the values at the positions 0 to 28 at an interval of "29". The example illustrated in FIG. 11 indicates an example in which the values of the positions 0 to 14 in the hashed bitmap h11 are copied to positions 29 to 43 in the intermediate bitmap h11'.

The restoring unit 252 generates an intermediate bitmap h12' from the hashed bitmap h12 of the base "31". The restoring unit 252 copies the values of the positions 0 to 30 in the hashed bitmap h12 to the positions 0 to 30 in the intermediate bitmap h12', respectively.

Regarding the positions after the position 31 in the intermediate bitmap h12', the restoring unit 252 repeatedly performs the process of copying each of the values at the positions 0 to 30 in the hashed bitmap h12 at an interval of "31". The example illustrated in FIG. 11 indicates an example in which the values of the positions 0 to 12 in the hashed bitmap h12 are copied to positions 31 to 43 in the intermediate bitmap h12'.

When the restoring unit 252 generates the intermediate bitmap h11' and the intermediate bitmap h12', the restoring unit 252 restores the bitmap b1 that has not been hashed by performing the AND operation on the intermediate bitmap h11' and the intermediate bitmap h12'. Regarding also the other hashed bitmaps, the restoring unit 252 can restore the inverted index associated with the command or the coordinates by repeatedly performing the same process.

The restoring unit 252 outputs the information on the restored inverted index to the specifying unit 253. In a description below, the inverted index restored by the restoring unit 252 is appropriately referred to as "target index".

The specifying unit 253 compares the target index restored by the restoring unit 252 with each of the inverted indexes in the inverted index table 241 and specifies the inverted index in which similarity satisfies a criterion from the inverted index table 241. The specifying unit 253 outputs the identification information associated with the specified inverted index and the additional information to the display unit 230.

For example, the specifying unit 253 sets, from among each of the commands and the coordinates in the inverted index, commands or the coordinates that are requested to be matched. The commands or the coordinates requested to be matched are referred to as a "designated item".

The specifying unit 253 compares the target index with the rows of the designated item of the inverted index and determines, when the offset in which "1" is set matches, that the inverted index is the index in which similarity satisfies a criterion of the subject inverted index.

Furthermore, the process of specifying the inverted index in which similarity satisfies the criterion performed by the specifying unit 253 is not limited to the process described above. For example, regarding all of the rows in the target index and the inverted index, the specifying unit 253 may also compare the offset in which "1" is set and specify, when the match rate is greater than or equal to a predetermined match rate, an inverted index as the inverted index in which similarity satisfies the criterion.

Figure 14:
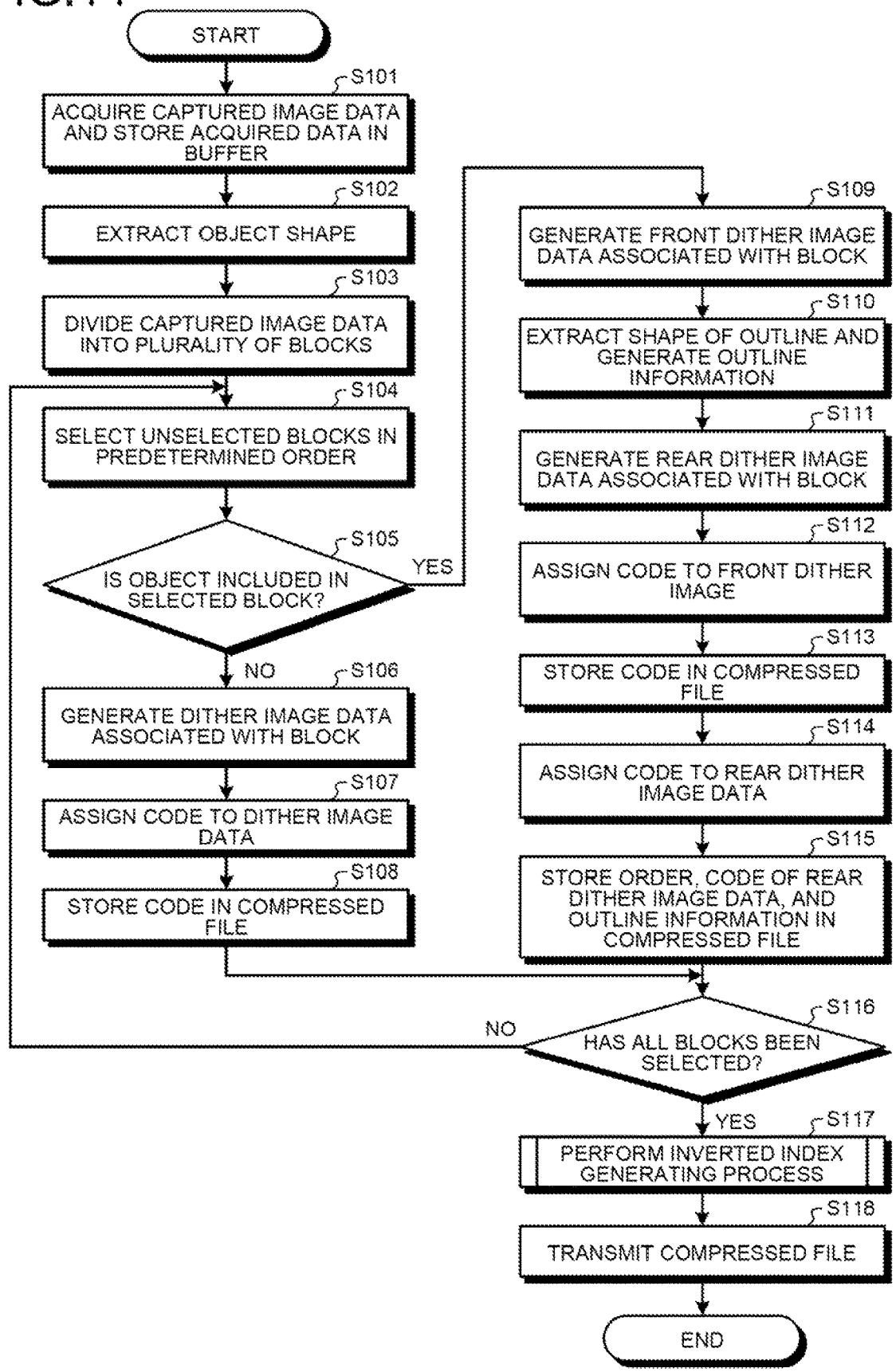
FIG. 14 is a flowchart illustrating the flow of a process performed by the file generating device according to the first embodiment.

In the following, an example of the flow of a process performed by the file generating device 100 according to the first embodiment will be described. FIG. 14 is a flowchart illustrating the flow of a process performed by the file generating device according to the first embodiment. As illustrated in FIG. 14, the acquiring unit 150a in the file generating device 100 acquires the captured image data and stores the acquired data in the buffer 141 (Step S101).

The extracting unit 150b in the file generating device 100 extracts the object shape based on the captured image data stored in the buffer (Step S102). The encoding unit 150c in the file generating device 100 divides the captured image data into a plurality of blocks (Step S103).

The encoding unit 150c selects an unselected block in a predetermined order (Step S104). The encoding unit 150c determines whether the object is included in the selected block (Step S105).

When the object is not included in the selected block (No at Step S105), the encoding unit 150c generates the dither image data with respect to the block (Step S106). The encoding unit 150c assigns a code to the dither image data (Step S107). The encoding unit 150c stores the code in the compressed file 142 (Step S108) and proceeds to Step S116.

A description will be given here by referring back to Step S105. When the object is included in the selected block (Yes at Step S105), the encoding unit 150c generates front dither image data with respect to the block (Step S109).

The encoding unit 150c extracts the shape of the outline and generates the outline information (Step S110). The encoding unit 150c generates the rear dither image data with respect to the block (Step S111).

The encoding unit 150c assigns a code to the front dither image (Step S112). The encoding unit 150c stores the code in the compressed file (Step S113). The encoding unit 150c assigns a code to the rear dither image data (Step S114).

The encoding unit 150c stores the order, the code of the rear dither image data, and the outline information in the compressed file (Step S115) and proceeds to Step S116.

The encoding unit 150c determines whether the encoding unit 150c has selected all of the blocks (Step S116). When the encoding unit 150c has not selected all of the blocks (No at Step S116), the encoding unit 150c proceeds to Step S104.

In contrast, when the encoding unit 150c has selected all of the blocks (Yes at Step S116), the encoding unit 150c proceeds to Step S117. The inverted index generating unit 150d in the file generating device 100 performs the inverted index generating process (Step S117). The transmission unit 150e in the file generating device 100 transmits the compressed file 142 to the information processing apparatus 200 (Step S118).

Figure 15:
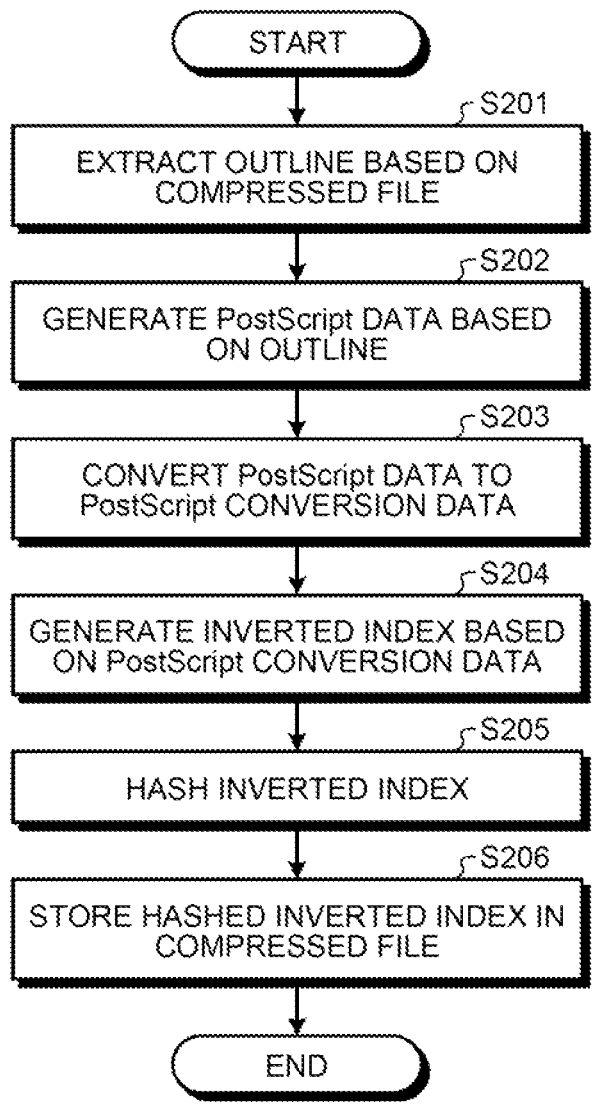
FIG. 15 is a flowchart illustrating the flow of a process of an inverted index generating process.

In the following, an example of the inverted index generating process described at Step S117 illustrated in FIG. 14 will be described. FIG. 15 is a flowchart illustrating the flow of the process of the inverted index generating process. As illustrated in FIG. 15, the inverted index generating unit 150d in the file generating device 100 extracts the outline based on the compressed file 142 (Step S201).

The inverted index generating unit 150d generates the PostScript data based on the outline (Step S202). The inverted index generating unit 150d converts the PostScript data to the PostScript conversion data (Step S203).

The inverted index generating unit 150d generates an inverted index based on the PostScript conversion data (Step S204). The inverted index generating unit 150d hashes the inverted index (Step S205). The inverted index generating unit 150d stores the hashed inverted index in the compressed file 142 (Step S206).

Figure 16:
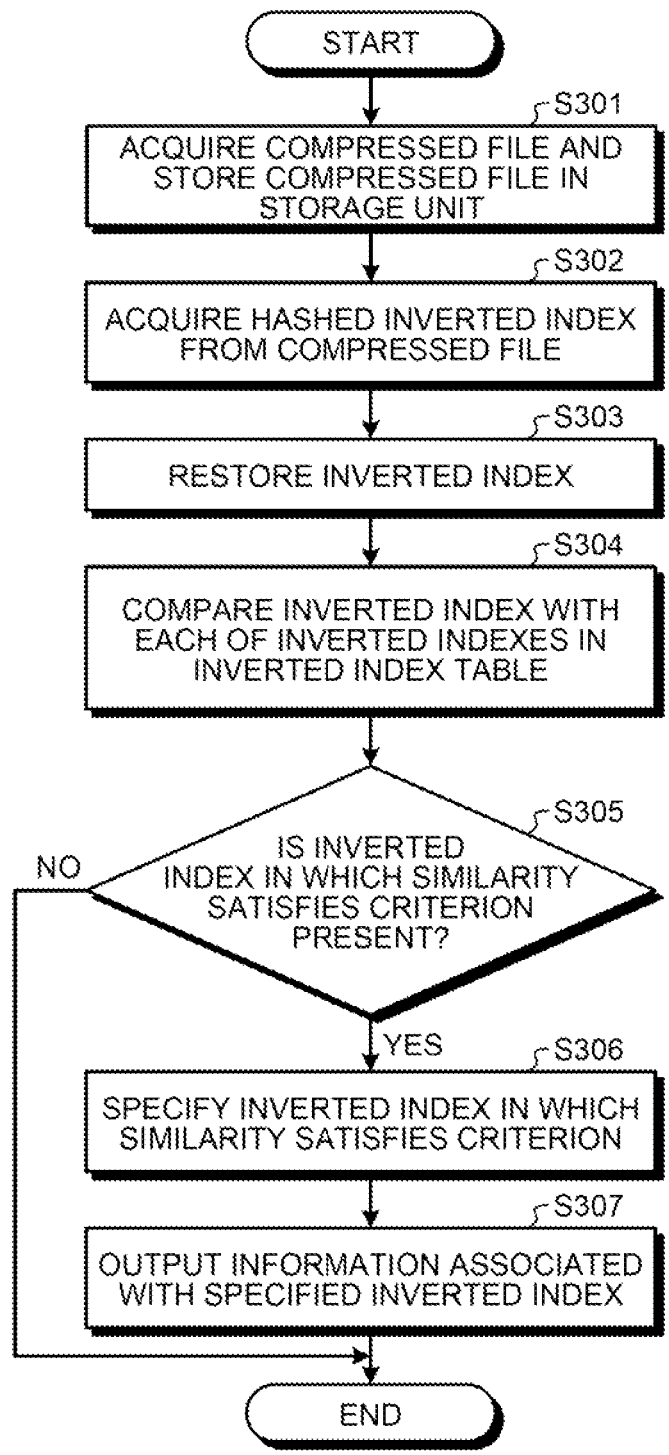
FIG. 16 is a flowchart illustrating the flow of a process performed by the information processing apparatus according to the first embodiment.

In the following, an example of the flow of a process performed by the information processing apparatus 200 according to the first embodiment will be described. FIG. 16 is a flowchart illustrating the flow of a process performed by the information processing apparatus according to the first embodiment. As illustrated in FIG. 16, the acquiring unit 251 in the information processing apparatus 200 acquires the compressed file 142 and stores the compressed file 142 in the storage unit 240 (Step S301).

The restoring unit 252 in the information processing apparatus 200 acquires the hashed inverted index from the compressed file 142 (Step S302). The restoring unit 252 restores the inverted index (Step S303).

The specifying unit 253 in the information processing apparatus 200 compares the inverted index with each of the inverted indexes in the inverted index table 241 (Step S304). When the inverted index in which similarity satisfies a criterion is present (Yes at Step S305), the specifying unit 253 proceeds to Step S306. In contrast, when the inverted index in which similarity satisfies a criterion is not present (No at Step S305), the specifying unit 253 ends the process.

The specifying unit 253 specifies the inverted index in which similarity satisfies the criterion (Step S306). The specifying unit 253 outputs the identification information and the additional information associated with the specified inverted index to the display unit 230 (Step S307).

In the following, the effects of the file generating device 100 and the information processing apparatus 200 according to the first embodiment will be described. When the file generating device 100 acquires the captured image data, the file generating device 100 specifies the shape of the object and generates the inverted index based on the specified shape. When the information processing apparatus 200 acquires the inverted index from the file generating device 100, the information processing apparatus 200 compares the acquired inverted index (target index) with the inverted index table 241 and acquires the information associated with the inverted index in which similarity to the target index satisfies the criterion. Consequently, it is possible to narrow down the candidates and perform the search process at high speed without drawing an object by using the PostScript data.

Furthermore, the information processing apparatus 200 compares the flag of each offset of the command or the coordinates included in the target index with the flag of each offset of the command or the coordinates included in each of the inverted indexes in the inverted index table 241. Consequently, it is possible to specify, at high speed, the inverted index in which similarity to the target index satisfies the criterion.

Furthermore, in the first embodiment, as an example, a description has been with the assumption that the file generating device 100 and the information processing apparatus 200 are separated devices; however, the embodiment is not limited to this. For example, an information processing apparatus in which the function of the file generating device 100 and the function of the information processing apparatus 200 are integrated may also perform the process according to the first embodiment described above.

For example, in addition to the configuration of the information processing apparatus 200 illustrated in FIG. 11, the information processing apparatus includes the acquiring unit 150a, the extracting unit 150b, the encoding unit 150c, and the inverted index generating unit 150d illustrated in FIG. 4. This information processing apparatus extracts the shape of the object from the captured image data of the image captured by the camera 100a and generates the PostScript data. The information processing apparatus converts the PostScript data to the PostScript conversion data and generates the inverted index. The information processing apparatus compares the generated inverted index with the inverted index table 241 and specifies the inverted index in which the similarity associated with the generated inverted index satisfies the criterion.

Second Embodiment

In the following, a process performed by an information processing apparatus according to the second embodiment will be described. The information processing apparatus performs a process of syntactic analysis, by maintaining the compressed format, on the compressed commands and the coordinates included in the PostScript compressed data and a process of drawing the outline.

Figure 17:
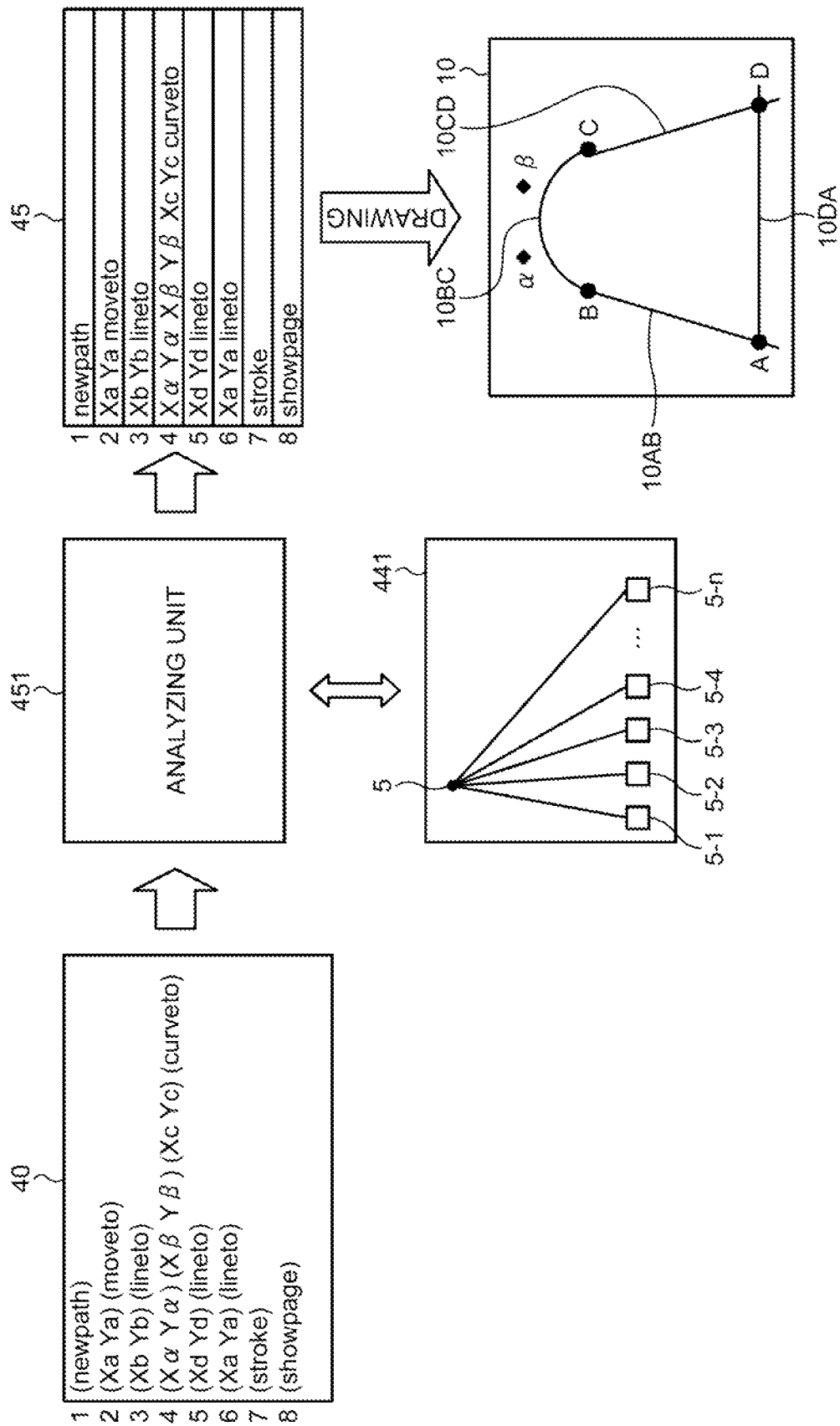
FIG. 17 is a diagram illustrating an example of a process performed by an information processing apparatus according to a second embodiment.

FIG. 17 is a diagram illustrating an example of a process performed by the information processing apparatus according to a second embodiment. In the example illustrated in FIG. 17, the information processing apparatus acquires PostScript compressed data 40. The PostScript compressed data 40 is coded in units of commands or in units of coordinates. The commands and the coordinates indicated in the parentheses illustrated in FIG. 17 indicate that the commands and the coordinates are the codes of coded commands and the coordinates, respectively.

An analyzing unit 451 in the information processing apparatus reads the codes in the PostScript compressed data 40 from the top, compares the codes with a Zelkova tree information 441, and specifies the commands or the coordinates assigned to the codes.

In the Zelkova tree information 441, a plurality of leaves 5-1 to 5-n are associated with a root 5. Regarding the leaves 5-1 to 5-n, the codes are associated with information on the commands or the coordinates associated with the codes. The analyzing unit 451 compares the code of each of the leaves 5-1 to 5-n in the Zelkova tree information 441 with the code in the PostScript compressed data 40 and specifies the command or the coordinates indicated by a hit leaf.

The analyzing unit 451 performs the process described above for each row of the PostScript compressed data 40 and repeatedly performs a process of storing the information on the specified command or the coordinates in a memory 45. The information processing apparatus sequentially draw the outline 10 based on the commands and the coordinates stored in the memory 45.

In the first row of the PostScript compressed data 40, the analyzing unit 451 compares the "code (newpath)" with the Zelkova tree information 441, specifies the command "newpath", and stores the command "newpath" in the memory 45.

In the second row of the PostScript compressed data 40, the analyzing unit 451 compares the "code (Xa,Ya)" with the Zelkova tree information 441, specifies the coordinates "Xa,Ya", and stores the coordinates "Xa,Ya" in the memory 45. The analyzing unit 451 compares the "code (moveto)" with the Zelkova tree information 441, specifies the command "moveto", and stores the command "moveto" in the memory 45. The information processing apparatus sets a control point A to the coordinates "Xa,Ya" at the time of performing analysis up to the second row of the PostScript compressed data 40.

In the third row of the PostScript compressed data 40, the analyzing unit 451 compares the "code (Xb,Yb)" with the Zelkova tree information 441, specifies the coordinates "Xb,Yb", and stores the specified data in the memory 45. The analyzing unit 451 compares the "code (lineto)" with the Zelkova tree information 441, specifies the command "lineto", and stores the specified data in the memory 45. At the time of performing analysis up to the third row of the PostScript compressed data 40, the information processing apparatus sets a control point B to the coordinates "Xb,Yb" and connects the control points A and B by a line AB.

In the fourth row of the PostScript compressed data 40, the analyzing unit 451 compares the "code (Xα,Yα)" with the Zelkova tree information 441, specifies the coordinates "Xα,Yα", and stores the specified data in the memory 45. The analyzing unit 451 compares the "code (Xβ,Yβ)" with the Zelkova tree information 441, specifies the coordinates "Xβ,Yβ", and stores the specified data in the memory 45. The analyzing unit 451 compares the "code (Xc,Yc)" with the Zelkova tree information 441, specifies the coordinates "Xc,Yc", and stores the specified data in the memory 45. The analyzing unit 451 compares the "code (curveto)" with the Zelkova tree information 441, specifies the command "curveto", and stores the specified data in the memory 45. At the time of performing analysis up to the third row of the PostScript compressed data 40, the information processing apparatus sets a control point α to the coordinates "Xα,Yα". Furthermore, the information processing apparatus sets a control point β to the coordinates "Xβ,Yβ", sets a control point C to the coordinates "Xc,Yc", and sets a curve 10BC.

In the fifth row of the PostScript compressed data 40, the analyzing unit 451 compares the "code (Xd,Yd)" with the Zelkova tree information 441, Specifies the coordinates "Xd,Yd", and stores the specified data in the memory 45. The analyzing unit 451 compares the "code (lineto)" with the Zelkova tree information 441, specifies the command "lineto", and stores the specified data in the memory 45. At the time of performing analysis up to the fifth row of the PostScript compressed data 40, the information processing apparatus sets a control point D to the coordinates "Xd,Yd" and connects the control points C and D by the line 10CD.

In the sixth row of the PostScript compressed data 40, the analyzing unit 451 compares the "code (Xa,Ya)" with the Zelkova tree information 441, specifies the coordinates "Xa,Ya", and stores the specified data in the memory 45. The analyzing unit 451 compares the "code (lineto)" with the Zelkova tree information 441, specifies the command "lineto", and stores the specified data in the memory 45. At the time of performing analysis up to the sixth row of the PostScript compressed data 40, the information processing apparatus connects the control points A and D by the line 10DA.

In the seventh row of the PostScript compressed data 40, the analyzing unit 451 compares the "code (stroke)" with the Zelkova tree information 441, specifies the command "stroke", and stores the specified data in the memory 45. In the eighth row of the PostScript compressed data 40, the analyzing unit 451 compares the "code (showpage)" with the Zelkova tree information 441, specifies the command "showpage", and stores the specified data in the memory 45. At the time of performing analysis up to the eighth row of the PostScript compressed data 40, the information processing apparatus completes the drawing of the outline 10.

In the example illustrated in FIG. 17, a description has been given of a case in which the analyzing unit 451 sequentially stores the commands and the coordinates in the different areas in the memory 45; however, if the area of the memory 45 is limited, information on the commands and the coordinates that are stored in the past may also be updated by new commands and coordinates.

As described above, the information processing apparatus according to the second embodiment performs a process of syntactic analysis, by maintaining the compressed format, on the compressed commands and the coordinates included in the PostScript compressed data and a process of drawing the outline. Consequently, it is possible to make larger amount of PostScript compressed data resident in the storage device and draw the outline by maintaining the compressed format at high speed.

Figure 18:
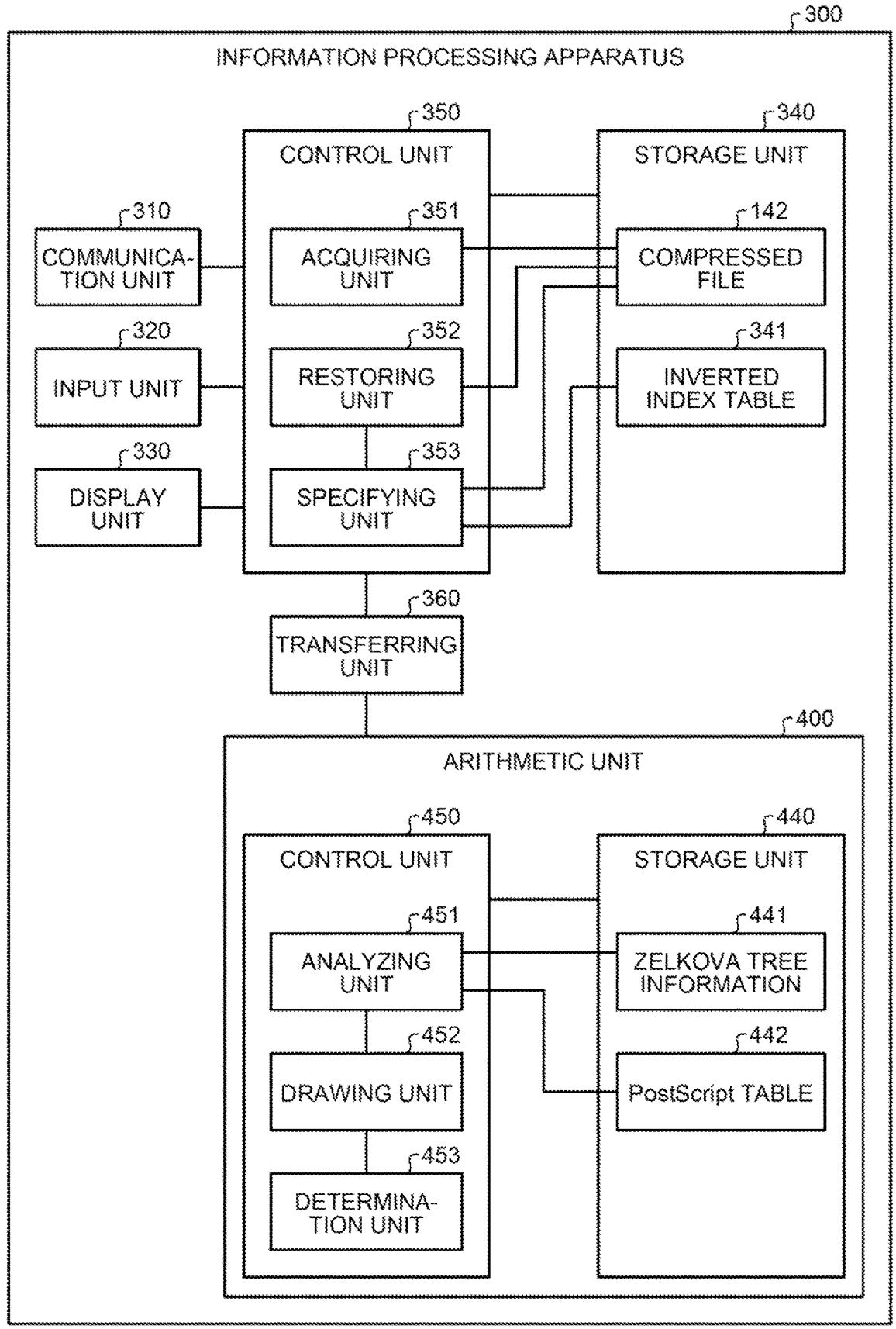
FIG. 18 is a functional block diagram illustrating a configuration of the information processing apparatus according to the second embodiment.

In the following, an example of a configuration of the information processing apparatus according to the second embodiment will be described. FIG. 18 is a functional block diagram illustrating a configuration of the information processing apparatus according to the second embodiment. As illustrated in FIG. 18, an information processing apparatus 300 includes a communication unit 310, an input unit 320, a display unit 330, a storage unit 340, and a control unit 350. Furthermore, the information processing apparatus 300 includes a transferring unit 360 and an arithmetic unit 400. For example, the information processing apparatus 300 corresponds to a personal computer (PC) or the like, the arithmetic unit 400 corresponds to a graphic card or the like connected to the PC.

The communication unit 310 is a processing unit that performs data communication with the file generating device 100 via the network 2 described in FIG. 3 or the like. The communication unit 310 is an example of a communication device.

The input unit 320 is an input device for inputting various kinds of information to the information processing apparatus 300. For example, the input unit 320 corresponds to a keyboard, a mouse, a touch panel, or the like.

The display unit 330 is a display device for displaying various kinds of information output from the control unit 350 and the arithmetic unit 400. For example, the display unit 230 corresponds to a liquid crystal display, a touch panel, or the like.

The compressed file 142 is a compressed file generated by the file generating device. The data structure of the compressed file 142 is the same as the data structure of the compressed file 142 described with reference to FIG. 6.

An inverted index table 341 is a table that holds information on the inverted indexes generated from each of the outlines of various kinds of the object shapes. FIG. 19 is a diagram illustrating an example of a data structure of an inverted index table according to the second embodiment. As illustrated in FIG. 19, the inverted index table 241 associates group identification information with inverted indexes.

The group identification information is information for uniquely identifying a group to which PostScript data belongs. For example, it is assumed that pieces of similar PostScript data are classified in the same group. The inverted index is an inverted index generated based on the outline of one of the pieces of PostScript data out of the pieces of the PostScript data belonging to the group identified by the group identification information.

A description will be given here by referring back to FIG. 18. The control unit 350 includes an acquiring unit 351, a restoring unit 352, and a specifying unit 353. The control unit 350 can be implemented by a CPU, an MPU, or the like. Furthermore, the control unit 250 can be implemented by hard-wired logic, such as an ASIC, an FPGA, or the like.

The acquiring unit 351 is a processing unit that acquires the compressed file 142 from the file generating device 100. The acquiring unit 351 stores the acquired compressed file 142 in the storage unit 340.

The restoring unit 352 is a processing unit that restores the hashed inverted index stored in the compressed file 142 to the inverted index. The restoring unit 352 outputs the restored inverted index to the specifying unit 353. The process in which the restoring unit 352 restores the hashed inverted index is the same as the process in which the restoring unit 252 restores the hashed inverted index described in the first embodiment. In a description below, the inverted index restored by the restoring unit 352 is appropriately referred to as a "target index".

The specifying unit 353 compares the target index restored by the restoring unit 352 with each of the inverted indexes in the inverted index table 341 and specifies the inverted index in which similarity satisfies a criterion from the inverted index table 341. The specifying unit 353 transfers the group identification information associated with the specified inverted index and the PostScript compressed data stored in the compressed file 142 to an arithmetic unit via the transferring unit 360.

The process of specifying an inverted index in which similarity satisfies a criterion from the inverted index table 341 performed by the specifying unit 353 is the same as the process of specifying an inverted index in which similarity satisfies a criterion from the inverted index table 241 performed by the specifying unit 253.

The transferring unit 360 is a processing unit that performs data transfer from the control unit 350 to the arithmetic unit 400 and that performs data transfer from the arithmetic unit 400 to the control unit 350. For example, the transferring unit 360 outputs the group identification information and the PostScript compressed data acquired from the control unit 350 to the arithmetic unit 400.

The arithmetic unit 400 includes a storage unit 440 and a control unit 450. The arithmetic unit 400 corresponds to a graphic card, or the like.

The storage unit 440 includes Zelkova tree information 441 and a PostScript table 442. The storage unit 440 corresponds to a video memory of a graphic card, or the like.

The Zelkova tree information 441 includes codes and a plurality of leaves in which commands or the coordinates of the PostScript data associated with the codes are associated. FIG. 20 is a diagram illustrating an example of a data structure of Zelkova tree information according to the second embodiment. As illustrated in FIG. 20, in the Zelkova tree information 441, the plurality of leaves 5-1 to 5-$n$ are associated with the root 5.

In FIG. 20, as an example, the data structure of a leaf 5-$m$ will be described. Here, m is a natural number between 1 and n, inclusive. The leaf 5-$m$ includes a leaf indicator, a compression code length, a code type, a compression code, and a pointer. The leaf indicator is information for uniquely identifying a leaf. The compression code length is information indicating the length of the code of the encoded command or the coordinates. The compression code length is 1 to 16 bits. The code type uniquely identifies the type of a code. For example, information indicating whether the code is a command or the coordinates is set to the code type. Furthermore, in addition to this, information indicating that the code is an operator, a numeric variable, a constant, or an address variable may also be set to the code type.

The compression code stores the codes assigned to the commands or the coordinates. For example, when the code type described above is a "command", the compression code is a code assigned to the command. When the code type is the "coordinates", the compression code is a code assigned to the coordinates.

The pointer is a pointer indicating the storage position of the information on the command or the coordinates associated with the code. The information on the command or the coordinates associated with the code is stored in a control area 6. For example, the control area 6 is an area arranged in the storage unit 440 and includes each of the commands "newpath, moveto, lineto, curveto, stroke, and showpage, . . . " associated with the codes. Furthermore, each of the coordinates "Xa, Ya, Xb, Yb, Xc, Yc, Xd, and Yd, . . . " associated with the codes is included in the control area 6.

The PostScript table 442 is a table that stores therein a plurality of pieces of PostScript compressed data. FIG. 21 is a diagram illustrating an example of the data structure of the PostScript table according to the second embodiment. As illustrated in FIG. 21, the PostScript table 442 associates group identification information, identification information, and PostScript compressed data with each other.

The group identification information is information for uniquely identifying a group to which the PostScript data belongs. The identification information is information for uniquely identifying an object. The PostScript compressed data is compressed data of the PostScript data generated from the outline of the subject object. It is assumed that PostScript compressed data is encoded in units of commands or in units of coordinates of the PostScript data.

The control unit 450 includes the analyzing unit 451, a drawing unit 452, and a determination unit 453. The control unit 450 is a control device corresponding to a graphics processing unit (GPU). The analyzing unit 451 and the drawing unit 452 is an example of an analysis processing unit.

The analyzing unit 451 is a processing unit that compares the PostScript compressed data with Zelkova tree information 441 and that outputs the command or the coordinates associated with each of the codes included in the PostScript compressed data to the drawing unit 452.

The analyzing unit 451 sequentially outputs, to the drawing unit 452, information on the command or the coordinates of each of the codes by performing a process described with reference to FIG. 17 on the PostScript compressed data that is acquired from the control unit 350. The analyzing unit 451 outputs, for each row of the PostScript compressed data, information on the command or the coordinates associated with the code to the memory 45 in the drawing unit 452.

For example, the analyzing unit 451 sets a position pointer to the top of the PostScript compressed data, compares the code starting from the position pointer with the compression code of the leaf in the Zelkova tree information 441, specifies a hit leaf, and extracts the command or the coordinates indicated by the pointer of the hit leaf from the control area 6. Then, the analyzing unit 451 moves the position pointer in the PostScript compressed data by the compression code length of the hit leaf and repeatedly performs the process described above.

Furthermore, the analyzing unit 451 sequentially outputs the information on the commands or the coordinates of each of the codes to the memory 45 in the drawing unit 452 by acquiring, from the PostScript table 442, the PostScript compressed data associated with the group identification information acquired from the control unit 350 and by performing the process described with reference to FIG. 17 on each of the pieces of the acquired PostScript compressed data. The analyzing unit 451 outputs the information on the command or the coordinates associated with the code for each row of the PostScript compressed data to the memory 45 in the drawing unit 452. It is assumed that, when the analyzing unit 451 outputs the information on the command or the coordinates associated with the code to the drawing unit 452, the analyzing unit 451 outputs the information by associating the information with the identification information that is associated with the PostScript compressed data.

The drawing unit 452 is a processing unit that refers to the memory 45 to be updated by the analyzing unit 451, that analyzes syntax of the PostScript data, and that generates the outline. The drawing unit 452 outputs information on the drawn outline to the determination unit 453. The outline associated with the PostScript compressed data stored in the compressed file 142 is referred to as a "target outline". Furthermore, it is assumed that identification information is associated with the outline that is associated with the PostScript compressed data in the PostScript table 442.

The determination unit 453 is a processing unit that compares the target outline with the other outlines and that determines the outline in which similarity to the target outline satisfies a criterion. The determination unit 453 outputs the identification information associated with the determined outline to the control unit 350 via the transferring unit 360 and notifies the control unit 350 of the identification information. For example, the determination unit 453 calculates the match rate of the target outline and each of the other outlines and determines that the outline having the match rate greater than or equal to a threshold is the outline in which similarity satisfies a criterion.

In the following, an example of the flow of a process performed by the arithmetic unit 400 according to the second embodiment will be described. FIG. 22 is a flowchart illustrating the flow of the process performed by the arithmetic unit according to the second embodiment. The analyzing unit 451 in the arithmetic unit 400 repeatedly performs the process illustrated in FIG. 22 every time the analyzing unit 451 acquires the PostScript compressed data and the drawing unit 452 in the arithmetic unit 400 generates an outline associated with the PostScript compressed data.

As illustrated in FIG. 22, the analyzing unit 451 in the arithmetic unit 400 acquires the PostScript compressed data (Step S401). The analyzing unit 451 selects the code on the first row of the PostScript compressed data (Step S402). The analyzing unit 451 specifies the command or the coordinates associated with the selected code based on the Zelkova tree information 441 and stores the specified data in the memory 45 (Step S403).

The drawing unit 452 in the arithmetic unit 400 updates the outline based on the commands and the coordinates stored in the memory 45 (Step S404). When the current row is the last row of the PostScript compressed data (Step S405), the analyzing unit 451 ends the process. In contrast, when the current row is not the last row (No at Step S405), the analyzing unit 451 selects the next row of the PostScript compressed data (Step S406) and proceeds to Step S403.

In the following, the effects of the information processing apparatus 300 according to the second embodiment will be described. The information processing apparatus 300 performs a process of performing syntactic analysis, by maintaining the compressed format, on the compressed commands and the coordinates included in the PostScript compressed data and a process of drawing the outline. Consequently, it is possible to make larger amount of PostScript compressed data resident in the storage device and draw the outline by maintaining the compressed format at high speed.

Figure 23:
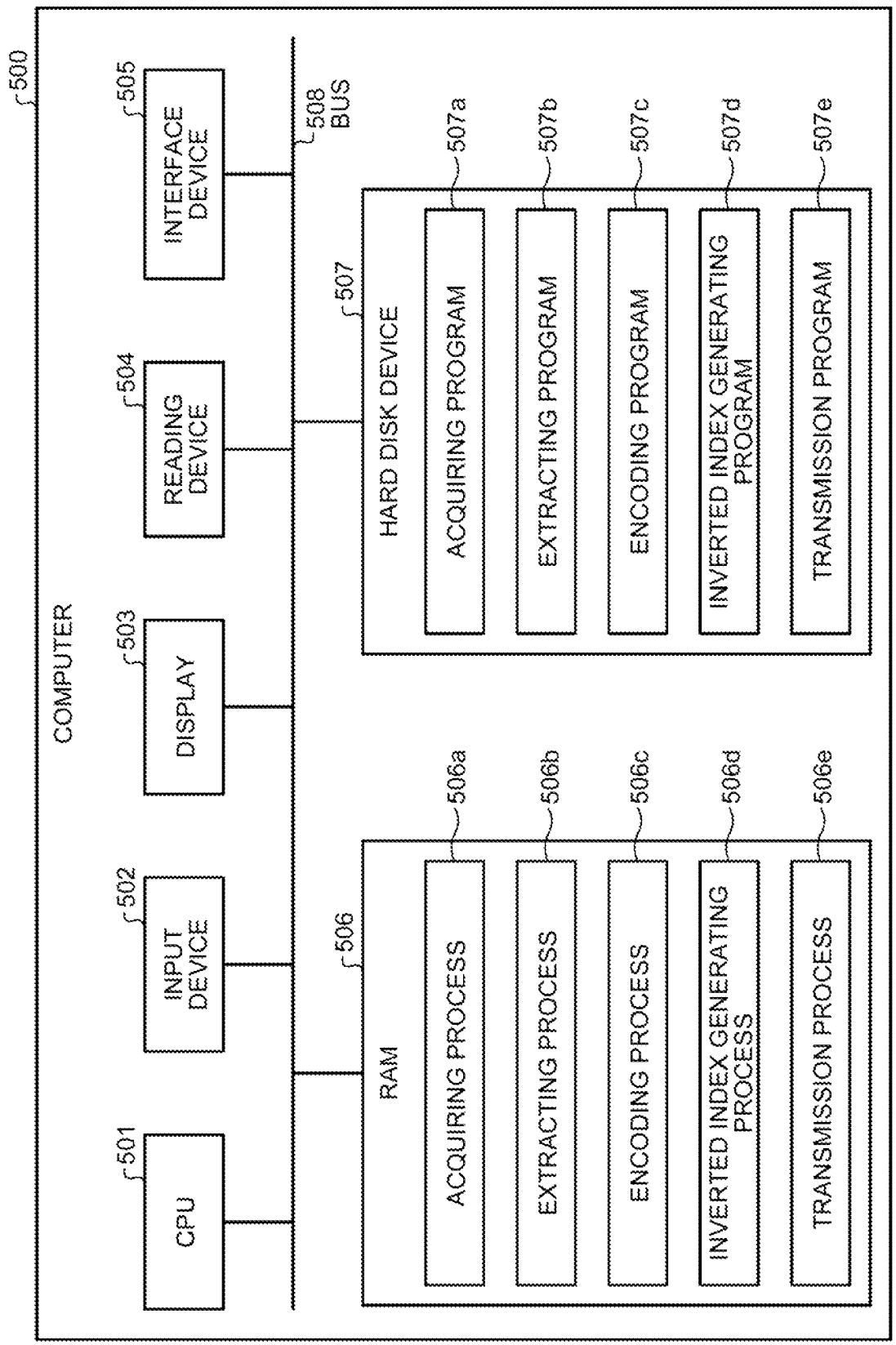
FIG. 23 is a diagram illustrating an example of a hardware configuration of a computer that implements the same function as that performed by the file generating device.

In the following, an example of a hardware configuration of a computer that implements the same function as that of the file generating device 100 described above in the embodiments. FIG. 23 is a diagram illustrating an example of the hardware configuration of the computer that implements the same function as that performed by the file generating device.

As illustrated in FIG. 23, a computer 500 includes a CPU 501 that executes various kinds of arithmetic processing, an input device 502 that received an input of data from a user, and a display 503. Furthermore, the computer 500 includes a reading device 504 that reads programs or the like from a storage medium and an interface device 505 that sends and receives data to and from an external device, a camera, or the like via a wired or wireless network. The computer 500 includes a RAM 506 that temporarily stores therein various kinds of information and a hard disk device 507. Furthermore, each of the devices 501 to 507 is connected to a bus 508.

The hard disk device 507 includes an acquiring program 507a, an extracting program 507b, an encoding program 507c, an inverted index generating program 507d, and a transmission program 507e. The CPU 501 reads the acquiring program 507a, the extracting program 507b, the encoding program 507c, the inverted index generating program 507d, and the transmission program 507e and loads the programs 507a to 507d in the RAM 506.

The acquiring program 507a functions as an acquiring process 506a. The extracting program 507b functions as an extracting process 506b. The encoding program 507c functions as an encoding process 506c. The inverted index generating program 507d functions as an inverted index generating process 506d. The transmission program 507e functions as a transmission process 506e.

The process of the acquiring process 506a corresponds to the process performed by the acquiring unit 150a. The process of the extracting process 506b corresponds to the process performed by the extracting unit 150b. The process of the encoding process 506c corresponds to the process performed by the encoding unit 150c. The process of the inverted index generating process 506d corresponds to the process performed by the inverted index generating unit 150d. The process of the transmission process 506e corresponds to the process performed by the transmission unit 150e.

Furthermore, each of the programs 507a to 507e does not need to be stored in the hard disk device 507 from the beginning. For example, each of the programs is stored in a "portable physical medium", such as a flexible disk (FD), a CD-ROM, a DVD disk, a magneto-optic disk, an IC CARD, that is to be inserted into the computer 500. Then, the computer 500 may also read each of the programs 507a to 507e and execute the programs.

Figure 24:
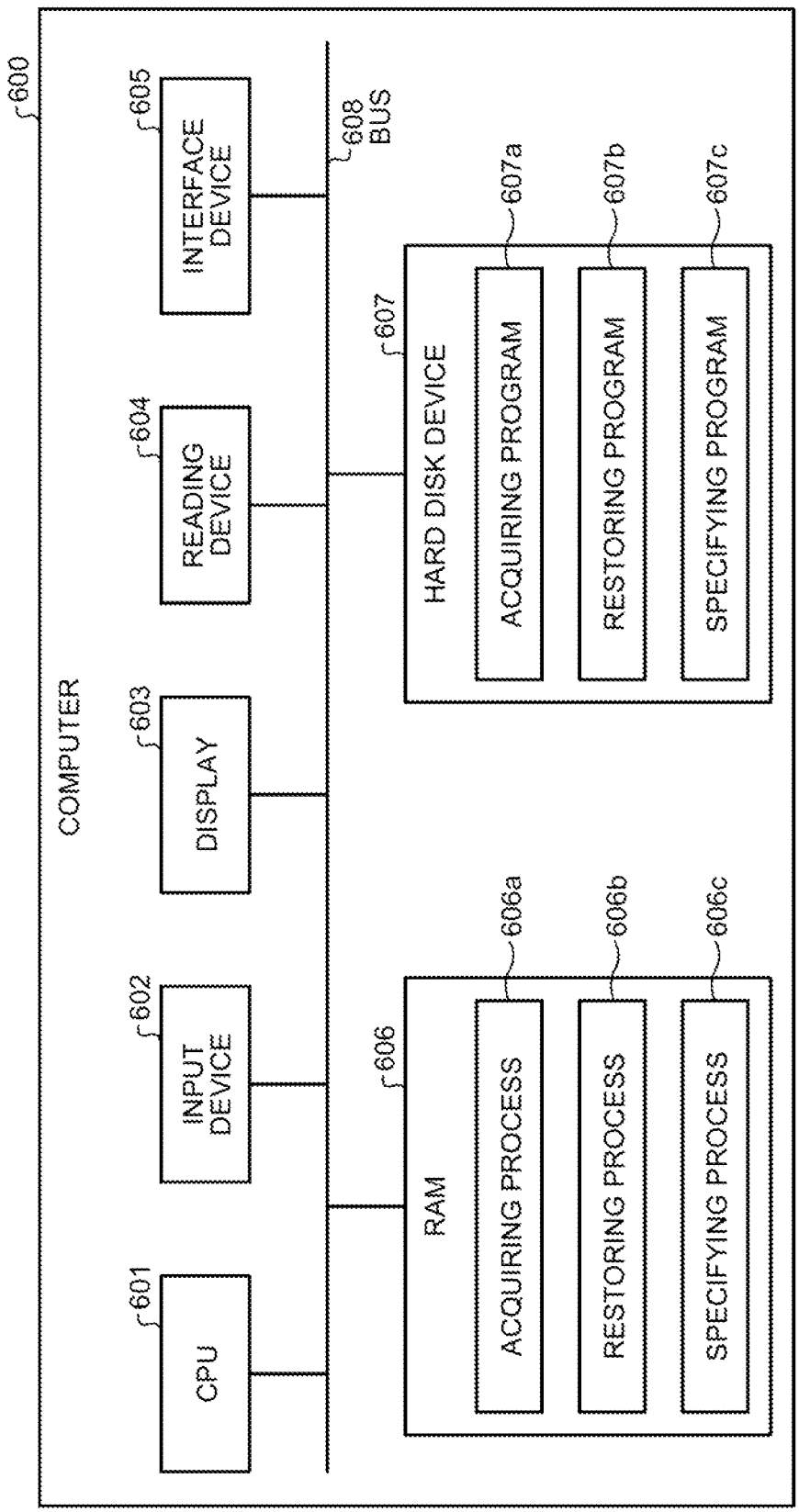
FIG. 24 is a diagram illustrating an example of a hardware configuration of a computer that implements the same function as that performed by the information processing apparatus according to the first embodiment.

In the following, an example of a hardware configuration of a computer that implements the same function as that of the information processing apparatus 200 described above in the embodiments. FIG. 24 is a diagram illustrating an example of the hardware configuration of a computer that implements the same function as that performed by the information processing apparatus according to the first embodiment.

As illustrated in FIG. 24, a computer 600 includes a CPU 601 that executes various kinds of arithmetic processing, an input device 602 that receives an input of data from a user, and a display 603. Furthermore, the computer 600 includes a reading device 604 that reads programs or the like from a storage medium, and an interface device 605 that sends and receives data to and from an external device via a wired or wireless network. The computer 600 includes a RAM 606 that temporarily stores therein various kinds of information and a hard disk device 607. Furthermore, each of the devices 601 to 607 is connected to a bus 608.

The hard disk device 607 includes an acquiring program 607a, a restoring program 607b, and a specifying program 607c. The CPU 601 reads the acquiring program 607a, the restoring program 607b, and the specifying program 607c and loads the programs 607a to 607c in the RAM 606.

The acquiring program 607a functions as an acquiring process 606a. The restoring program 607b functions as a restoring process 606b. The specifying program 607c functions as a specifying process 606c.

The process of the acquiring process 606a corresponds to the process performed by the acquiring unit 251. The process of the restoring process 606b corresponds to the process performed by the restoring unit 252. The process of the specifying process 606c corresponds to the process performed by the specifying unit 253.

Furthermore, each of the programs 607a to 607c does not need to be stored in the hard disk device 607 from the beginning. For example, each of the programs is stored in a "portable physical medium", such as a flexible disk (FD), a CD-ROM, a DVD disk, a magneto-optic disk, an IC CARD, that is to be inserted into the computer 600. Then, the computer 600 may also read each of the programs 607a to 607c and execute the programs.

Figure 25:
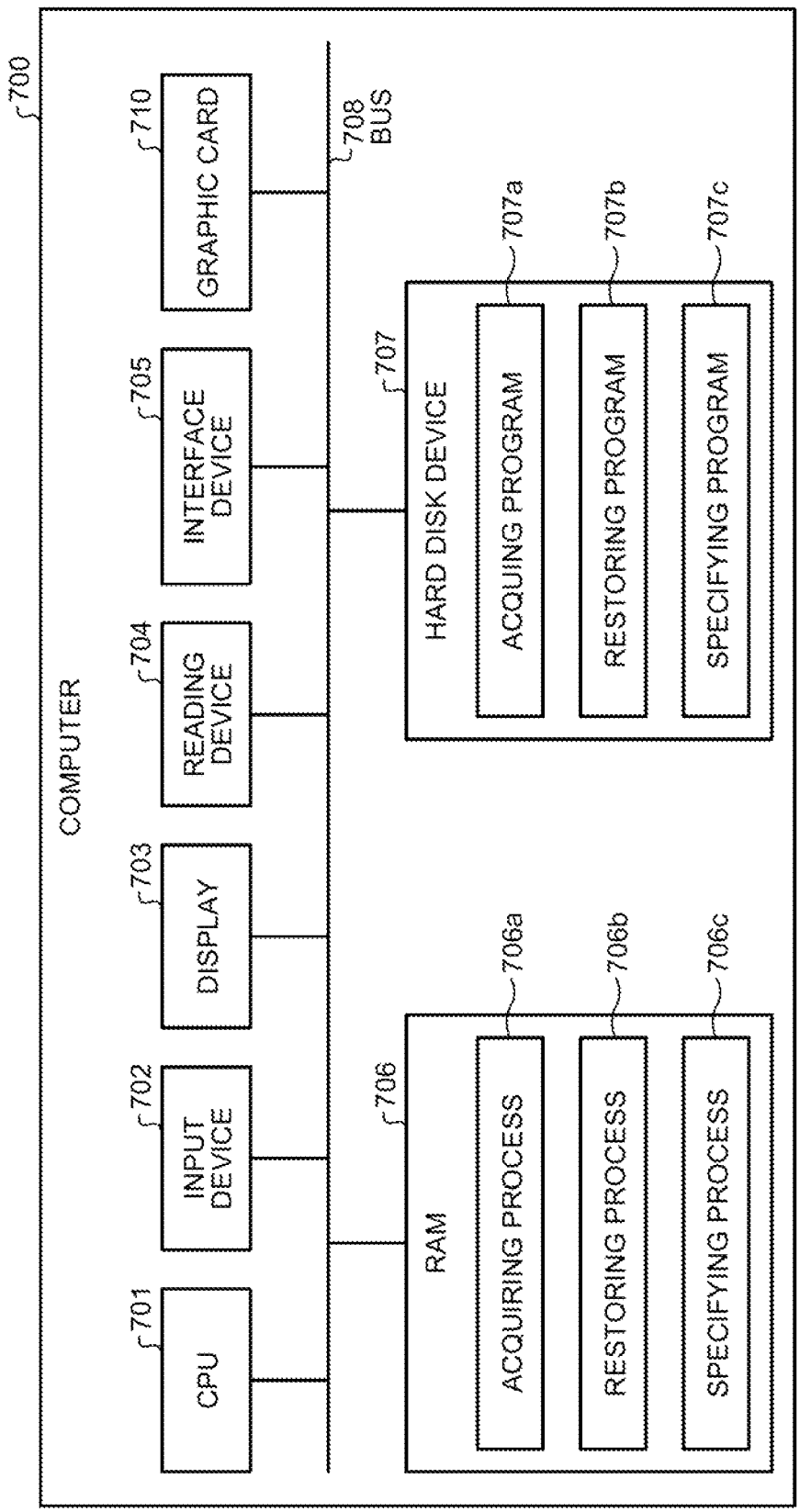
FIG. 25 is a diagram illustrating an example of a hardware configuration of a computer that implements the same function as that performed by the information processing apparatus according to the second embodiment.

An example of a hardware configuration of a computer that implements the same function as that of the information processing apparatus 200 described above in the embodiments. FIG. 25 is a diagram illustrating an example of a hardware configuration of a computer that implements the same function as that performed by the information processing apparatus according to the second embodiment.

As illustrated in FIG. 25, a computer 700 includes a CPU 701 that executes various kinds of arithmetic processing, an input device 702 that receives an input of data from a user, and a display 703. Furthermore, the computer 700 includes a reading device 704 that reads programs or the like from a storage medium and interface device 705 that sends and receives data to and from an external device via a wired or wireless network. The computer 700 includes a RAM 706 that temporarily stores therein various kinds of information and a hard disk device 707. Furthermore, the computer 700 includes a graphic card 710. The graphic card 710 is a device that corresponds to the arithmetic unit 400. Furthermore, each of the devices 701 to 707 is connected to a bus 708.

The hard disk device 707 includes an acquiring program 707a, a restoring program 707b, and a specifying program 707c. The CPU 701 reads the acquiring program 707a, the restoring program 707b, and the specifying program 707c and loads the programs 707a to 707c in the RAM 706.

The acquiring program 707a functions as an acquiring process 706a. The restoring program 707b functions as a restoring process 706b. The specifying program 707c functions as a specifying process 706c.

The process of the acquiring process 706a corresponds to the process performed by the acquiring unit 351. The process of the restoring process 706b corresponds to the process performed by the restoring unit 352. The process of specifying process 706c corresponds to the process performed by the specifying unit 353.

Furthermore, each of the programs 707a to 707c does not need to be stored in the hard disk device 707 from the beginning. For example, each of the programs is stored in a "portable physical medium", such as a flexible disk (FD), a CD-ROM, a DVD disk, a magneto-optic disk, an IC CARD, that is to be inserted into the computer 700. Then, the computer 700 may also read each of the programs 707a to 707c and execute the programs.

It is possible to reduce the processing load applied to specify objects included in a captured image.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An acquiring method comprising:
   extracting, when a captured image captured by an image capturing device is acquired, based on the acquired captured image, a shape of an object included in the captured image, using a processor;
   generating, based on the extracted shape, text information that includes a drawing indication of the shape, the drawing indication including control sentences and coordinates used for drawing the shape, using the processor;
   generating, based on the generated text information, conversion data in which the control sentences and the coordinates are sequentially arranged using the processor;
   generating an inverted index that indicates an appearance position of each of the control sentences and the coordinates within the conversion data using the processor; and
   acquiring, based on a storage unit that stores therein, regarding each of a plurality of objects, identification information of each of the objects in association with an inverted index of each of the objects, identification information of an object that is associated with an inverted index whose similarity to the generated inverted index satisfies a criterion from among the plurality of objects, wherein the similarity is determined based on the appearance position in the generated inverted index and the appearance position in the inverted index stored in the storage unit, using the processor.

2. The acquiring method according to claim 1, further comprising:
   generating encoded text information by performing encoding in units of control sentences or in units of coordinates included in the generated text information, using the processor;
   analyzing codes encoded in units of control sentences or in units of coordinates included in the encoded text information by sequentially reading the codes, using the processor; and
   generating the shape of the object, using the processor.

3. A non-transitory computer readable recording medium having stored therein an acquiring program that causes a computer to execute a process comprising:
   extracting, when a captured image captured by an image capturing device is acquired, based on the acquired captured image, a shape of an object included in the captured image;
   generating, based on the extracted shape, text information that includes a drawing indication of the shape, the drawing indication including control sentences and coordinates used for drawing the shape;
   generating, based on the generated text information, conversion data in which the control sentences and the coordinates are sequentially arranged;
   generating an inverted index that indicates an appearance position of each of the control sentences and the coordinates within the conversion data; and acquiring, based on a storage unit that stores therein, regarding each of a plurality of objects, identification information of each of the objects in association an inverted index of each of the objects, identification information of an object that is associated with an inverted index whose similarity to the generated inverted index satisfies a criterion from among the plurality of objects, wherein the similarity is determined based on the appearance position in the generated inverted index and the appearance position in the inverted index stored in the storage unit.

4. The non-transitory computer readable recording medium according to claim 3, wherein the process further comprises:
generating encoded text information by performing encoding in units of control sentences or in units of coordinates included in the generated text information;
analyzing codes encoded in units of control sentences or in units of coordinates included in the encoded text information by sequentially reading the codes; and
generating the shape of the object.

5. An information processing apparatus comprising:
a processor that executes a process comprising:
extracting, when a captured image captured by an image capturing device is acquired, based on the acquired captured image, a shape of an object included in the captured image;
generating, based on the extracted shape, text information that includes a drawing indication of the shape, the drawing indication including control sentences and coordinates used for drawing the shape;
generating, based on the generated text information, conversion data in which the control sentences and the coordinates are sequentially arranged;
generating an inverted index that indicates an appearance position of each of the control sentences and the coordinates within the conversion data; and
acquiring, based on a storage unit that stores therein, regarding each of a plurality of objects, identification information of each of the objects in association with an inverted index of each of the objects, identification information of an object that is associated with an inverted index whose similarity to the generated inverted index satisfies a criterion from among the plurality of objects, wherein the similarity is determined based on the appearance position in the generated inverted index and the appearance position in the inverted index stored in the storage unit.

6. The information processing apparatus according to claim 5, wherein the process further comprises:
generating encoded text information by performing encoding in units of control sentences or in units of coordinates included in the generated text information;
analyzing codes encoded in units of control sentences or in units of coordinates included in the encoded text information by sequentially reading the codes; and
generating the shape of the object.

* * * * *